(12) United States Patent
Hirayama

(10) Patent No.: US 9,828,056 B2
(45) Date of Patent: **\*Nov. 28, 2017**

(54) VEHICLE PROVIDED WITH LEANING-CAPABLE VEHICLE-BODY FRAME AND TWO FRONT WHEELS

(71) Applicant: YAMAHA HATSUDOKI KABUSHIKI KAISHA, Iwata-shi, Shizuoka (JP)

(72) Inventor: Yosuke Hirayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 31 days.

This patent is subject to a terminal disclaimer.

(21) Appl. No.: 14/901,391

(22) PCT Filed: Jun. 30, 2014

(86) PCT No.: PCT/JP2014/067480
§ 371 (c)(1),
(2) Date: Dec. 28, 2015

(87) PCT Pub. No.: WO2015/002167
PCT Pub. Date: Jan. 8, 2015

(65) Prior Publication Data
US 2016/0152293 A1    Jun. 2, 2016

(30) Foreign Application Priority Data
Jul. 1, 2013    (JP) ................... 2013-138483

(51) Int. Cl.
*B62K 5/10* (2013.01)
*B62K 5/05* (2013.01)
(Continued)

(52) U.S. Cl.
CPC ............ *B62K 5/10* (2013.01); *B60G 3/20* (2013.01); *B60G 21/05* (2013.01); *B62K 5/027* (2013.01);
(Continued)

(58) Field of Classification Search
CPC . B62K 5/10; B62K 5/027; B62K 5/08; B62K 19/38; B60G 3/20; B60G 21/05
See application file for complete search history.

(56) References Cited

U.S. PATENT DOCUMENTS

| 6,953,203 B2 | 10/2005 | Wilcox et al. |
| D547,242 S | 7/2007 | Lambri |

(Continued)

FOREIGN PATENT DOCUMENTS

| CN | 102092434 A | 6/2011 |
| CN | 103153769 A | 6/2013 |

(Continued)

OTHER PUBLICATIONS

Official Communication issued in International Application PCT/JP2014/067480, dated Sep. 22, 2014.
(Continued)

*Primary Examiner* — Faye M Fleming
(74) *Attorney, Agent, or Firm* — Keating and Bennett, LLP

(57) ABSTRACT

A brake controlling operation transmission member includes a leaning-associated deforming portion that deforms in response to turning of a body frame. A vehicle includes at least a portion of the leaning-associated deforming portion located between a first restrictor located below a lower cross portion in relation to an up-and-down direction of the body frame and a central portion in a left-and-right direction of the body frame so as to prevent movement of the brake controlling operation transmission member and a brake device.

7 Claims, 24 Drawing Sheets

(51) Int. Cl.

| | |
|---|---|
| *B62K 5/08* | (2006.01) |
| *B62K 19/38* | (2006.01) |
| *B62K 5/027* | (2013.01) |
| *F16D 65/00* | (2006.01) |
| *F16D 65/12* | (2006.01) |
| *B62L 3/02* | (2006.01) |
| *B62L 3/08* | (2006.01) |
| *B60G 3/20* | (2006.01) |
| *B60G 21/05* | (2006.01) |

(52) U.S. Cl.
CPC .................. *B62K 5/05* (2013.01); *B62K 5/08* (2013.01); *B62K 19/38* (2013.01); *B62L 3/023* (2013.01); *B62L 3/08* (2013.01); *F16D 65/0062* (2013.01); *F16D 65/12* (2013.01); *B60G 2300/45* (2013.01)

(56) References Cited

U.S. PATENT DOCUMENTS

| | | |
|---|---|---|
| 7,543,829 B1 | 6/2009 | Barnes |
| D598,328 S | 8/2009 | Lambri |
| 2004/0140645 A1 | 7/2004 | Hayashi |
| 2005/0093270 A1 | 5/2005 | Wilcox et al. |
| 2005/0167174 A1 | 8/2005 | Marcacci |
| 2006/0049006 A1 | 3/2006 | Hasegawa et al. |
| 2006/0151232 A1 | 7/2006 | Marcacci |
| 2013/0168944 A1 | 7/2013 | Bartolozzi et al. |
| 2016/0137252 A1* | 5/2016 | Hirayama ................ B62K 5/05 280/124.103 |
| 2016/0137253 A1* | 5/2016 | Hirayama ................ B62K 5/05 280/124.103 |
| 2017/0050693 A1* | 2/2017 | Matties ................... B62K 5/10 |

FOREIGN PATENT DOCUMENTS

| | | |
|---|---|---|
| DE | 10 2010 052 716 A1 | 6/2011 |
| EP | 2 368 729 A1 | 9/2011 |
| FR | 2 881 395 A1 | 8/2006 |
| FR | 2 907 416 A1 | 4/2008 |
| FR | 2 926 776 A1 | 7/2009 |
| JP | 60-38250 A | 2/1985 |
| JP | 62-39353 A | 2/1987 |
| JP | 62-90264 U | 6/1987 |
| JP | 4-26195 U | 3/1992 |
| JP | 7-236661 A | 9/1995 |
| JP | 2001-10577 A | 1/2001 |
| JP | 2002-337779 A | 11/2002 |
| JP | 2005-313876 A | 11/2005 |
| JP | 2006-69437 A | 3/2006 |
| JP | 2006-160254 A | 6/2006 |
| JP | 2006-281853 A | 10/2006 |
| JP | 2010-184508 A | 8/2010 |
| JP | 2010-228551 A | 10/2010 |
| JP | 2011-42223 A | 3/2011 |
| JP | 2011-195099 A | 10/2011 |
| KR | 10-2006-0046801 B1 | 5/2006 |
| KR | 10-0889463 B1 | 3/2009 |
| KR | 10-2013-0101609 A | 9/2013 |
| WO | 2005058680 A1 | 6/2005 |
| WO | 2009/059099 A2 | 5/2009 |
| WO | 2012/007819 A1 | 1/2012 |

OTHER PUBLICATIONS

Piaggio, Catalogo Parti Di Ricambio, NTRC000U01, MP3 300 ie LT, Mod. ZAPM34102, 116 pages.

Takano et al.; "Vehicle"; U.S. Appl. No. 14/430,376, filed Mar. 23, 2015.

Official Communication issued in corresponding European Patent Application No. 14 820 443.1, dated Jun. 17, 2016.

\* cited by examiner

VEHICLE PROVIDED WITH LEANING-CAPABLE VEHICLE-BODY FRAME AND TWO FRONT WHEELS

BACKGROUND OF THE INVENTION

1. Field of the Invention

The present invention relates to a vehicle including a body frame that leans and two front wheels.

2. Description of the Related Art

As a vehicle including a body frame that leans and two front wheels, for example, U.S. Design Pat. No. 547,242 and Catalogo parti di ricambio, MP3 300 ie LT Mod. ZAPM64102, Piaggio disclose a vehicle which includes two front wheels and one rear wheel.

In general, the vehicle including the body frame that leans and the two front wheels is a vehicle that turns with the body frame leaning from a vertical direction. More specifically, the body frame leans to the right when the vehicle turns right, whereas when the vehicle turns left, the body frame leans to the left. The vehicle including the body frame that leans and the two front wheels has a distance between the two wheels that are aligned in a left-and-right direction of the body frame that is shorter than that of a general four-wheeled vehicle so as to ensure that the body frame leans as required. The vehicle including the two front wheels and the body frame that leans is a vehicle which is compact in size in relation to the left-and-right direction.

In the vehicle including the body frame that leans and the two front wheels, a brake master cylinder is provided on a handlebar, and brake calipers are provided at lower portions of suspension devices. The master cylinder and the brake calipers are connected by a brake hose. The brake hose includes a leaning associated deforming portion which deforms in association with the leaning of the body frame and a wheel turning associated deforming portion which deforms in association with the turning of the two front wheels.

In the vehicles described in U.S. Design Pat. No. 547,242 and Catalogo parti di ricambio, MP3 300 ie LT Mod. ZAPM64102, Piaggio which include the body frame that leans and the two front wheels, both the leaning associated deforming portion and the wheel turning associated deforming portion are provided directly above a link mechanism. The interference of the brake hose with the link mechanism is prevented by collecting the deforming portions of the brake hose at a location directly above the link mechanism. This prevents the interference of an upper cross portion and a lower cross portion which move largely up and down when they are activated with the brake hose.

In the vehicles described in U.S. Design Pat. No. 547,242 and Catalogo parti di ricambio, MP3 300 ie LT Mod. ZAPM64102, Piaggio which include the body frame that leans and the two front wheels, however, since the deforming portions of the brake hose are collected at a location directly above an upper surface of the link mechanism, a large space is necessary directly above the upper surface of the link mechanism so as to allow the brake hose to deflect. Then, it is necessary to secure a large space between the location directly above the upper surface of the link mechanism and an upper surface of a cover. This increases the space between the link mechanism and the cover, eventually increasing the size of the cover and, as a result, the front portion of the vehicle.

SUMMARY OF THE INVENTION

Preferred embodiments of the present invention provide a vehicle including a body frame that leans and two front wheels which prevents an increase in size of a front portion of the vehicle by providing a unique layout of a braking operation transmission member such as a brake hose.

According to a preferred embodiment of the present invention, a vehicle includes a body frame that leans to a right of the vehicle when the vehicle turns right and that leans to a left of the vehicle when the vehicle turns left; a right front wheel and a left front wheel that are aligned in a left-and-right direction of the body frame; aright suspension device that supports the right front wheel at a lower portion thereof and that absorbs an upward displacement of the right front wheel in an up-and-down direction of the body frame; a left suspension device that supports the left front wheel at a lower portion thereof and that absorbs an upward displacement of the left front wheel in the up-and-down direction of the body frame; a link mechanism which includes a right side portion that supports an upper portion of the right suspension device so as to allow the upper portion to turn about a right steering axis that extends in the up-and-down direction of the body frame, a left side portion that supports an upper portion of the left suspension device so as to allow the upper portion to turn about a left steering axis that is parallel to the right steering axis, an upper cross portion that supports an upper portion of the right side portion at a right end portion thereof so as to allow the upper portion to turn about an upper right axis that extends in a front-and-rear direction of the body frame, supports an upper portion of the left side portion at a left end portion thereof so as to allow the upper portion to turn about an upper left axis that is parallel to the upper right axis, and that is supported on the body frame at a middle portion thereof so as to turn about an upper middle axis that is parallel to the upper right axis and the upper left axis, and a lower cross portion that supports a lower portion of the right side portion at a right end portion so as to allow the lower portion to turn about a lower right axis that is parallel to the upper right axis, supports a lower portion of the left side portion at a left end portion thereof so as to allow the lower portion to turn about a lower left axis that is parallel to the upper left axis, and that is supported on the body frame at a middle portion thereof so as to turn about a lower middle axis that is parallel to the upper middle axis; a cover that covers at least of a portion of the link mechanism; a brake device that is provided below the link mechanism to apply a braking force to, at least, one of the right front wheel and the left front wheel; a brake controller that is provided above the link mechanism in relation to the up-and-down direction of the body frame to control the brake device; and a brake controlling operation transmission member that connects the brake controller with the brake device to transmit a brake controlling operation that is inputted into the brake controller to the brake device; wherein the brake controlling operation transmission member includes a leaning associated deforming portion that deforms in response to the leaning of the body frame; and at least a portion of the leaning associated deforming portion is located between a first restrictor that is provided below the lower cross portion in relation to the up-and-down direction of the body frame and at a central portion in the left-and-right direction of the body frame to prevent the movement of the brake controlling operation transmission member.

When the link mechanism is activated to operate, a right member that includes the right front wheel, a right brake device, and a right shock absorber turns about the lower right axis that extends in the front-and-rear direction relative to the lower cross portion. When the link mechanism is activated to operate, a left member that includes the left front wheel, a left brake device, and a left shock absorber turns about the lower left axis that extends in the front-and-rear direction relative to the lower cross portion. Because of this, a space is provided between the lower cross portion and the right member and the left member to prevent the interference therebetween, so that the space is secured to permit the operations of these members. When attempting to dispose an additional member in this space, a careful design is necessary so as to prevent the interference of the additional member with the other members, and hence, this space is a space where no additional member is desired to be disposed. Because of this, in general, the deforming portions of the brake controlling operation transmission member such as the brake hose are desired not to be disposed in those spaces.

In the vehicles of U.S. Design Pat. No. 547,242 and Catalogo parti di ricambio, MP3 300 ie LT Mod. ZAPM64102, Piaggio, the deforming portions of the brake hose are collected at a location directly above the upper cross portion. Because of this, the brake hose is laid out compactly.

In the vehicles of U.S. Design Pat. No. 547,242 and Catalogo parti di ricambio, MP3 300 ie LT Mod. ZAPM64102, Piaggio, however, although the brake hose itself is laid out compactly, the front portion of the vehicle is enlarged.

Then, the inventor studied in detail the movement of the brake controlling operation transmission member and the operation of the link mechanism with a view to finding out another method of preventing the interference of the brake controlling operation transmission member such as the brake hose with the link mechanism.

The inventor studied in detail the movement of the brake controlling operation transmission member and the operation of the link mechanism with a view to finding out another method of preventing the interference of the brake controlling operation transmission member such as the brake hose with the link mechanism.

The link mechanism includes the right side portion, the left side portion, the upper cross portion, and the lower cross portion.

The right side portion supports the upper portion of the right suspension device so as to turn about the right steering axis that extends in the up-and-down direction of the body frame.

The left side portion supports the upper portion of the left suspension device so as to turn about the left steering axis that is parallel to the right steering axis.

The upper cross portion supports the upper portion of the right side portion at the right end portion thereof so as to turn about the upper right axis that extends in the front-and-rear direction of the body frame, supports the upper portion of the left side portion at the left end portion thereof so as to turn about the upper left axis that is parallel to the upper right axis, and is supported on the body frame at the middle portion thereof so as to turn about the upper middle axis that is parallel to the upper right axis and the upper left axis.

The lower cross portion supports the lower portion of the right side portion at the right end portion thereof so as to allow it to turn about the lower right axis that is parallel to the upper right axis, supports the lower portion of the left side portion at the left end portion thereof so as to allow it to turn about the lower left axis that is parallel the upper left axis, and is supported on the body frame at the middle portion thereof so as to turn about the lower middle axis that is parallel to the upper middle axis.

When the link mechanism is activated to operate, the right member that includes the right front wheel, the right brake device, and the right shock absorber turns about the lower right axis that extends in the front-and-rear direction relative to the lower cross portion. When the link mechanism is activated to operate, a left member that includes the left front wheel, a left brake device, and a left shock absorber turns about the lower left axis that extends in the front-and-rear direction relative to the lower cross portion. Because of this, since the lower cross portion, the right member, and the left member are all turned about the axes that extend in the front-and-rear direction when the link mechanism is activated to operate, they are displaced largely in the up-and-down and left-and-right directions but are not displaced largely in the front-and-rear direction. In particular, although the link mechanism is activated to operate, the lower cross portion, the right member, and the left member are not displaced largely relative to each other in the front-and-rear direction.

The leaning associated deforming portion is a portion of the brake controlling operation transmission member such as the brake hose that is located between positions that are fixed to two points (for example, one point on the lower cross portion and one point on the brake device) that are displaced relative to each other in association with the operation of the link mechanism. A portion that deforms when the relative positions of these two points in the up-and-down direction change largely is the leaning associated deforming portion. Since the constituent members of the link mechanism turn about the axes that extend in the front-and-rear direction, although the leaning associated deforming portion has to change its shape or posture largely in the up-and-down direction, the leaning associated deforming portion does not have to do so and can change its posture a little in the directions other than the up-and-down direction. For example, by causing the brake controlling operation transmission member to deform along a plane that is perpendicular or substantially perpendicular to the front-and-rear direction when the distance between the two points is reduced in the up-to-direction to allow the two points to approach each other, the change in posture of the leaning associated deforming portion in relation to the front-and-rear direction is small.

The inventor has discovered, based on the knowledge obtained by the analysis above, a challenging layout in which the brake controlling operation transmission member and the lower cross portion, the right member and the left member are positioned near each other to prevent the interference of the brake controlling operation transmission member with the lower cross portion, the right member, and the left member.

According to a preferred embodiment of the present invention, at least a portion of the leaning associated deforming portion is located between the first restrictor that is provided below the lower cross portion in relation to the up-and-down direction of the body frame and at the central portion in the left-and-right direction of the body frame to prevent the movement of the brake controlling operation transmission member and the brake device. It is noted that the central portion in the left-and-right direction is a central portion that results from dividing the vehicle in the left-and-right direction into three areas of a right portion, a central portion, and a left portion when looking at the vehicle from the front thereof.

Since the lower cross portion turns, at the middle portion thereof, relative to the body frame about the lower middle axis that extends in the front-and-rear direction, when the link mechanism is activated to operate, the right member that is supported at the right end portion of the lower cross portion and the left member that is supported at the left end portion thereof are displaced largely relative to the first restrictor that is located below the lower cross portion and at the central portion in the left-and-right direction in the left-and-right and up-and-down directions of the body frame but are not displaced largely in the front-and-rear direction. Then, in the event that the leaning associated deforming portion is provided between the first restrictor and the brake device so as to deform along the plane that is perpendicular or substantially perpendicular to the front-and-rear direction, the leaning associated deforming portion deforms largely in the up-and-down direction but does not deform largely in the front-and-rear direction.

According to this configuration, since the lower cross portion is displaced largely relative to the right member and the left member in the up-and-down direction but is not displaced largely in the front-and-rear direction and the leaning associated deforming portion is displaced largely in the up-and-down direction but is not displaced largely in the front-and-rear direction, the lower cross portion and the leaning associated deforming portion tend to change their shapes or postures in similar directions. That the link mechanism and the leaning associated deforming portion tend to change their postures in similar directions means that the directions in which the link mechanism and the leaning associated deforming portion change their postures largely and the directions in which they change their postures by a very small or minimal amount are similar and that the timings at which the link mechanism and the leaning associated deforming portion change their postures are similar. Because of this, the first restrictor is provided below the lower cross portion and at the central portion in the left-and-right direction and the leaning associated deforming portion is provided between the first restrictor and the brake device, so that even in the event that the leaning associated deforming portion is disposed near the lower cross portion, the right member, and the left member, they are prevented from interfering with each other. In particular, since the leaning associated deforming portion are provided in the space that is provided to permit the displacement of the lower cross portion and the right member and the left member, even in the event that the leaning associated deforming portion is provided, the expansion of the space that permits the displacement is significantly reduced or prevented.

Because of this, the leaning associated deforming portion is provided in the space that permits the displacement of the lower cross portion, the right member, and the left member, so that the vehicle is small in size while securing the space where to accommodate the brake controlling operation transmission member. This provides the vehicle including the two front wheels and the body frame that leans which prevents the enlargement in size of the front portion of the vehicle while ensuring the degree of freedom in designing the suspension devices and the front wheels.

In a preferred embodiment of the present invention, the following configurations may be used. The vehicle includes a steering shaft that is supported on the body frame between the right suspension device and the left suspension device in the left-and-right direction of the body frame so as to turn about a middle steering axis that extends in the up-and-down direction of the body frame; a handlebar that is provided at an upper end portion of the steering shaft; and a wheel turning operation transmission mechanism that turns the right suspension device about the right steering axis and turns the left suspension device about the left turning axis in association with the turning of the steering shaft that is activated in response to the operation of the handlebar; wherein the brake controlling operation transmission member includes a wheel turning associated deforming portion that deforms in response to the turning of the right suspension device and the left suspension device, and at least a portion of the wheel turning associated deforming portion is disposed below the lower cross portion in relation to the up-and-down direction of the body frame and between the first restrictor and the brake device.

The wheel turning associated deforming portion is a portion of the brake controlling operation transmission member that is located between positions that are fixed to two points (for example, one point on the lower cross portion and one point on the brake device) that are displaced largely relative to each other as the right front wheel and the left front wheel are turned. The portion of the brake controlling operation transmission member that deforms when the relative positions of these two points in the front-and-rear or left-and-right direction change largely constitutes the wheel turning associated deforming portion. The right front wheel turns about the right steering axis, and the left front wheel turns about the left steering axis. Therefore, the wheel turning associated deforming portion has to change its shape or posture largely in the front-and-rear or the left-and-right direction but does not have to change its shape or posture largely in the up-and-down direction. For example, in the event that the brake controlling operation transmission member is deformed along a plane that is perpendicular or substantially perpendicular to the up-and-down direction when the distance between the two points in the left-and-right direction or the front-and-rear direction is reduced, the change in posture of the wheel turning associated deforming portion is small in the up-and-down direction.

On the other hand, when the right front wheel and the left front wheel are turned, the right front wheel turns about the right steering axis that extends in the up-and-down direction and the left front wheel turns about the left steering axis that extends in the up-and-down direction. The right front wheel and the left front wheel move largely in the front-and-rear or left-and-right direction relative to the lower cross portion but do not move largely in the up-and-down direction relative to the lower cross portion.

In this manner, the right front wheel and the left front wheel are displaced largely relative to the lower cross portion in the front-and-rear or left-and-right direction, and the wheel turning associated deforming portion is also displaced largely relative to the lower cross portion in the same direction. However, the right and left front wheels and the wheel turning associated deforming portion are not displaced largely in the up-and-down direction. In particular, the right and left front wheels and the wheel turning associated deforming portion tend to be displaced relative to the lower cross portion in the similar directions. Because of this, even though at least a portion of the wheel turning associated deforming portion is provided below the lower cross portion, it is easy to prevent the interference of the wheel turning associated deforming portion with the right front wheel or the left front wheel. In this manner, it is possible to provide the wheel turning associated deforming portion using the space provided to permit the displacement of the right front wheel or the left front wheel. In other words, even though the wheel turning associated deforming portion is provided, the expansion of the space provided to permit the deformation of the wheel turning associated deforming portion is prevented.

In a preferred embodiment of the present invention, the following configurations may be used. At least a portion of the wheel turning associated deforming portion is provided below the lower cross portion in relation to the up-and-down direction of the body frame so as to cross the lower cross portion in the front-and-rear direction of the body frame in a side view of the vehicle.

Since a front-and-rear dimension of the right front wheel and the left front wheel becomes large when the vehicle is in the upright state, a large space is secured below the lower cross portion so as to prevent the interference of the lower cross portion with the right front wheel and the left front wheel. The wheel turning associated deforming portion is provided so that the wheel turning associated deforming portion crosses the lower cross portion in the front-and-rear direction by using the space below the lower cross portion largely. This prevents the enlargement in size of the vehicle while absorbing the deformation of the brake controlling operation transmission member resulting from the turning of the right front wheel and the left front wheel by causing the wheel turning associated deforming portion to deform largely.

In a preferred embodiment of the present invention, the following configurations may be used. The first restrictor is provided at a portion of the wheel turning operation transmission mechanism that moves so as to maintain a parallel relationship with the lower cross portion when the body frame leans.

When the right front wheel and the left front wheel are turned, the wheel turning operation transmission mechanism that moves to maintain the parallel relationship with the lower cross portion is activated to operate. When the link mechanism is activated to operate, a portion of the wheel turning operation transmission mechanism that moves to maintain the parallel relationship with the lower cross portion is displaced. In particular, a portion of the wheel turning operation transmission mechanism that moves to maintain the parallel relationship with the lower cross portion moves either of when the body frame leans and when the right front wheel and the left front wheel are turned.

In the event that the first restrictor is provided at a portion of the wheel turning operation transmission mechanism that moves to maintain the parallel relationship with the lower cross portion, it is easy to cause the brake controlling operation transmission member to deform in association with the leaning of the body frame and the turning of the right front wheel and the left front wheel. Because of this, even in the event that the leaning associated deforming portion and the wheel turning associated deforming portion are provided, the vehicle is small in size while securing the space where to accommodate the brake controlling operation transmission member.

In a preferred embodiment of the present invention, the following configurations may be used. The vehicle includes a steering shaft that is supported on the body frame between the right suspension device and the left suspension device in the left-and-right direction of the body frame so as to turn about a middle steering axis that extends in the up-and-down direction of the body frame, and the brake controlling operation transmission member is inserted through an interior of the steering shaft.

The steering shaft prevents the interference of the brake controlling operation transmission member that is inserted through the interior of the steering shaft with the link mechanism and the like. Additionally, since a separate space to dispose the brake controlling operation transmission member does not have to be provided by allowing the brake controlling operation transmission member to be inserted through the interior of the steering shaft that is provided originally on the vehicle, the vehicle is small in size.

In a preferred embodiment of the present invention, the following configurations may be used. The vehicle includes a steering shaft that is supported on the body frame between the right suspension device and the left suspension device in the left-and-right direction of the body frame so as to turn about a middle steering axis that extends in the up-and-down direction of the body frame, and a handlebar that is provided at an upper end portion of the steering shaft, and a second restrictor that prevents the movement of the brake controlling operation transmission member is provided on the steering shaft or a member that turns together with the steering shaft above the upper cross portion in the up-and-down direction of the body frame.

When the handlebar is turned, the steering shaft and the member that turns together with the steering shaft turn about the middle steering axis.

Since the first restrictor is provided below the lower cross portion and at the center in the left-and-right direction, the portion of the brake controlling operation transmission member that is located between the first restrictor and the second restrictor extends in the up-and-down direction at the central portion in relation to the left-and-right direction of the body frame. This portion deforms so as to twist about the axis that extends in the up-and-down direction when the handlebar is turned.

In particular, when the handlebar is turned, the steering shaft and the member that turns together with the steering shaft turn about the middle steering axis that extends in the up-and-down direction, and the portion of the brake controlling operation transmission member that is located between the first restrictor and the second restrictor deforms about the axis that extends in the up-and-down direction. Since the steering shaft and the member that turns together with the steering shaft and the portion of the brake controlling operation transmission member tend to change their shapes or postures in similar directions, even in the event that they are disposed near to each other, they are prevented from interfering with each other.

Additionally, since the portion of the brake controlling operation transmission member that is located between the first restrictor and the second restrictor deform in such a way as to twist about the axis that extends in the up-and-down direction, the space where the brake controlling operation transmission member is accommodated is small in size while permitting the deformation of the portion of the brake controlling operation transmission member.

In a preferred embodiment of the present invention, the following configurations may be used. A portion of the brake controlling operation transmission member that is located between the second restrictor and the first restrictor is provided along the steering shaft.

Since the portion of the brake controlling operation transmission member that is located between the first restrictor and the second restrictor is allowed to deform about the middle steering axis, the brake controlling operation transmission member is prevented from interfering with the steering shaft and the member that turns together with the steering shaft, and the space is small where the brake controlling operation transmission member is accommodated while permitting the deformation of the portion of the brake controlling operation transmission member.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, referring to the accompanying drawings, an example of a first preferred embodiment of the present invention will be described. In this preferred embodiment, the vehicle will be described as being a vehicle including two front wheels and one rear wheel.

Figure 1:
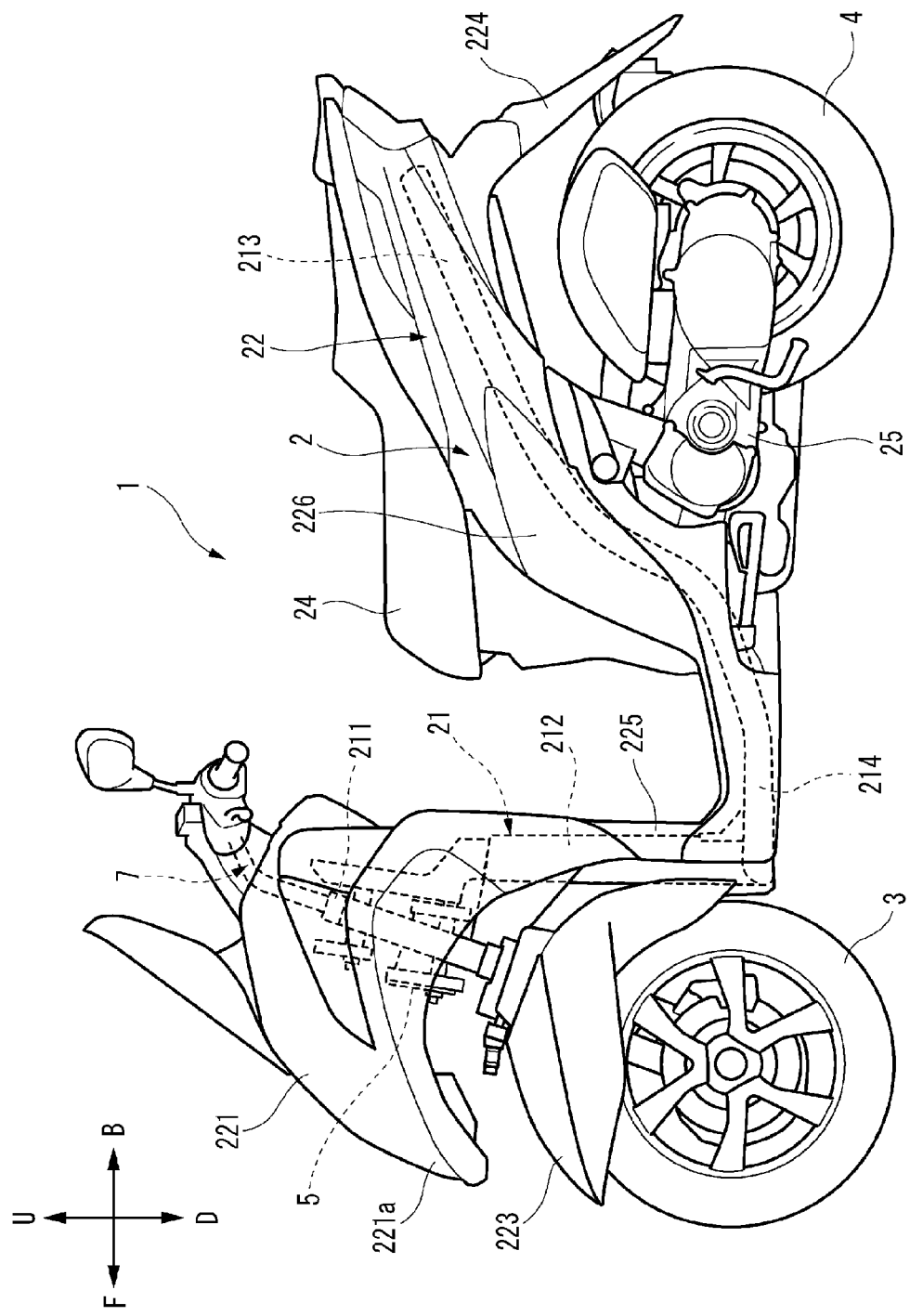
FIG. 1 is an overall side view of a vehicle according to a first preferred embodiment of the present invention.

FIG. 1 shows an overall side view of the vehicle 1 seen from the left of the vehicle 1. Hereinafter, in the drawings, an arrow F denotes a forward direction of the vehicle 1 and an arrow B denotes a rearward direction of the vehicle 1. An arrow U denotes an upward direction of the vehicle 1 and an arrow D denotes a downward direction of the vehicle 1. When forward, rearward, leftward, and rightward directions are referred to in the following description, they mean forward, rearward, leftward, and rightward directions as seen from a rider of the vehicle 1. An up-and-down direction means a vertical direction and also a substantially up-and-down direction which inclines from the vertical direction. A left-and-right direction means a horizontal direction and also a substantially left-and-right direction which inclines from the horizontal direction. A center in a vehicle's width direction means a central position of the vehicle 1 in the vehicle's width direction. A left in the vehicle's width direction means a direction from the center in the vehicle's width toward left. A right in the vehicle's width direction means a direction from the center in the vehicle's width toward right. An unloaded state of the vehicle means a state in which the vehicle 1 is in the upright state with front wheels neither steered nor caused to lean in such a state that no rider rides on and no fuel is put in the vehicle 1.

As shown in FIG. 1, the vehicle 1 includes a vehicle main body portion 2, a pair of left and right front wheels 3 (refer to FIG. 2), a rear wheel 4, a steering mechanism 7, and a link mechanism 5. The vehicle main body portion 2 includes a body frame 21, a body cover 22, a seat 24, and a power unit 25.

The body frame 21 includes a headstock 211, a down frame 212, an under frame 214, and a rear frame 213. In FIG. 1, in the body frame 21, portions that are hidden by the body cover 22 are shown by broken lines. The body frame 21 supports the power unit 25, the seat 24 and the like. The power unit 25 includes a drive source such as an engine, an electric motor or the like, a transmission and the like.

The headstock 211 is disposed at a front portion of the vehicle 1. The headstock 211 is slanted with respect to the vertical direction so that, in a side view of the vehicle 1, an upper portion thereof is positioned behind the lower portion thereof. The steering mechanism 7 and the link mechanism 5 are disposed around the headstock 211. A steering shaft 60 of the steering mechanism 7 is inserted into the headstock 211 so as to be turned therein. The headstock 211 supports the link mechanism 5. The headstock 211 is a portion of the body frame 21 and leans to the right when the vehicle 1 leans to the right and leans to the left when the vehicle 1 leans to the left.

The down frame 212 is connected to the headstock 211. The down frame 212 is disposed behind the headstock 211 and extends along the up-and-down direction. The under frame 214 is connected to a lower portion of the down frame 212. The under frame 214 extends rearward from the lower portion of the down frame 212. The rear frame 213 is disposed behind the under frame 214 and extends obliquely rearward and upward. The rear frame 213 supports the seat 24, the power unit 25, a tail lamp and the like.

The body frame 21 is covered by the body cover 22. The body cover 22 includes a front cover 221, pair of left and right mudguards 223, a leg shield 225, a center cover 226, and a rear mudguard 224.

The front cover 221 is positioned ahead of the seat 24. The front cover 221 covers at least portions of the steering mechanism 7 and the link mechanism 5. The front cover 221 includes a front portion 221a that is disposed ahead of the link mechanism 5. In a side view of the vehicle 1 in an unloaded state, the front portion 221a of the front cover 221 is provided above the front wheels 3. In the side view of the vehicle 1 in the unloaded state, the front portion 221a of the front cover 221 is disposed behind front ends of the front wheels 3. The leg shield 225 is disposed below the front cover 221 and ahead of the seat 24. The center cover 226 covers the circumference of the rear frame 213.

The pair of left and right front mudguards 223 (see FIG. 2) is disposed directly below the front cover 221 and directly above the pair of front wheels 3. The rear mudguard 224 is disposed directly above a rear portion of the rear wheel 4.

The pair of left and right front wheels 3 is disposed below the headstock 211 and directly below the front cover 221 when the vehicle 1 is unloaded. The rear wheel 4 is disposed below the center cover 226 and the rear mudguard 224.

Figure 2:
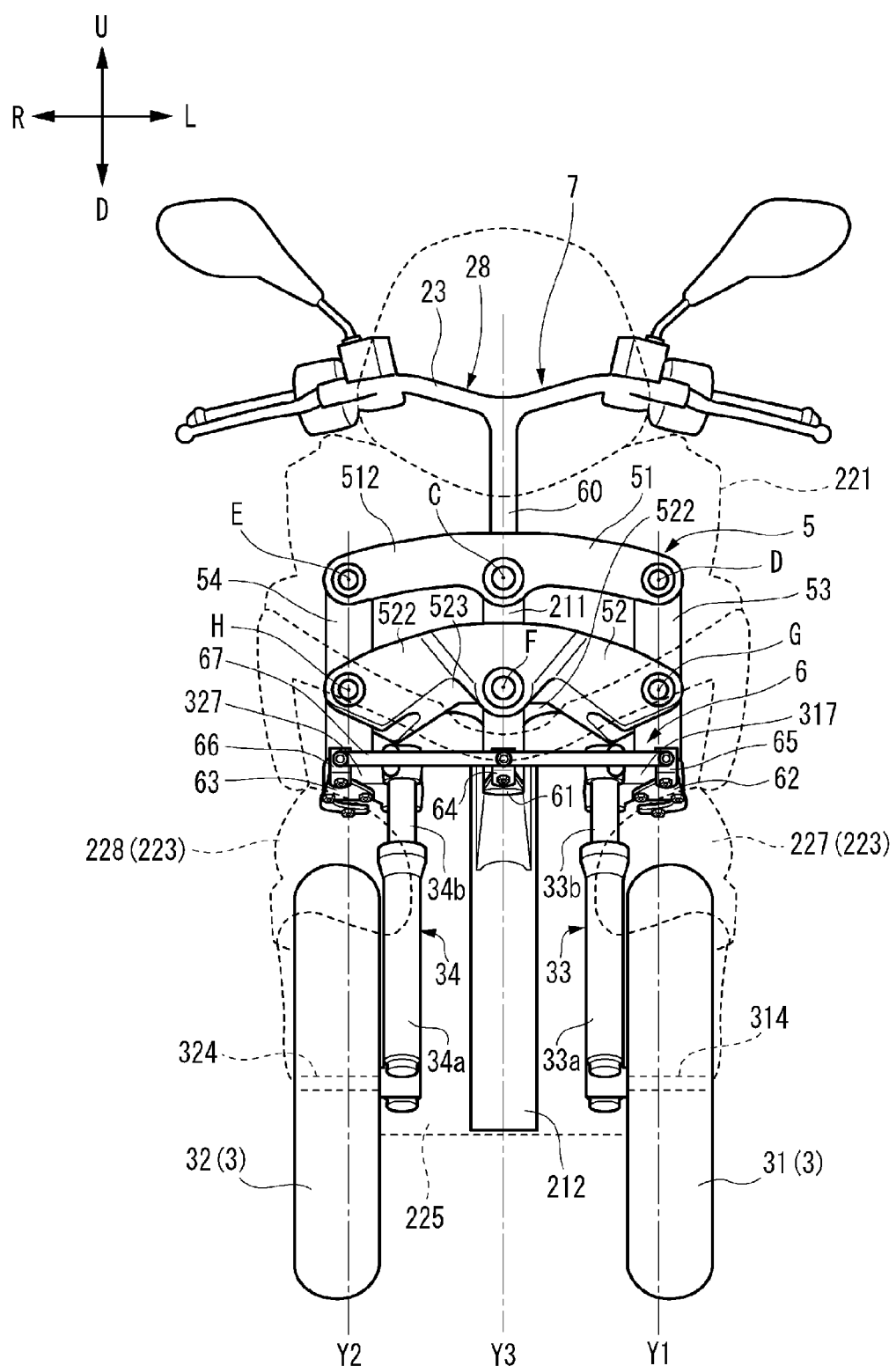
FIG. 2 is a front view of a front portion of the vehicle shown in FIG. 1.
Figure 3:
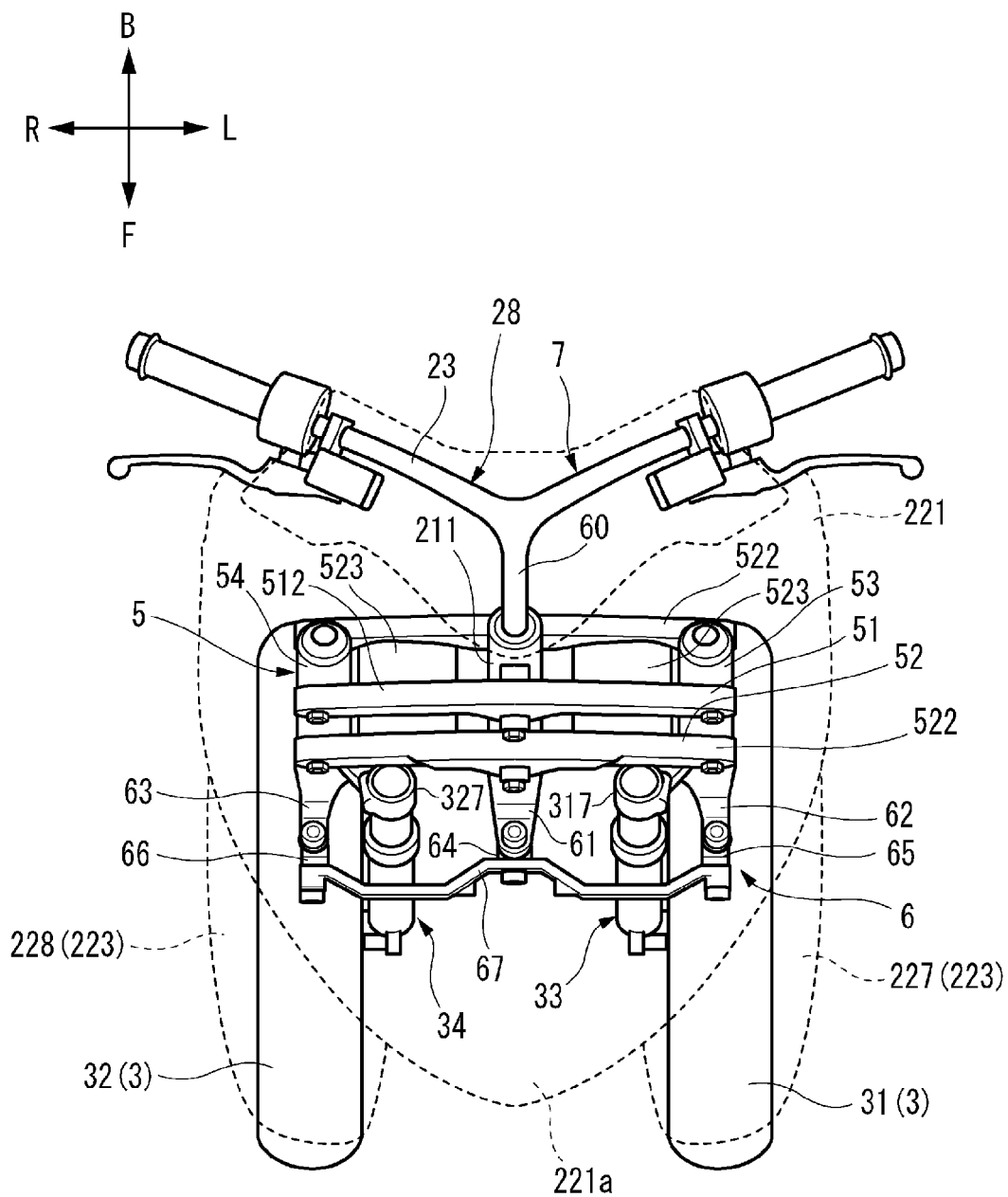
FIG. 3 is a plan view of the front portion of the vehicle shown in FIG. 1.

FIG. 2 is a front view of the front portion of the vehicle 1 shown in FIG. 1 when viewed from the front thereof. FIG. 3 is a plan view of the front portion of the vehicle 1 shown in FIG. 1 when viewed from thereabove. FIGS. 2 and 3 show the front portion of the vehicle 1 as seen through the body cover 22.

As shown in FIGS. 2 and 3, the steering mechanism 7 includes a wheel turning operation transmission mechanism 6, a left shock absorber 33, a right shock absorber 34, and a pair of left and right front wheels 3.

The pair of right and left front wheels 3 includes the left front wheel 31 and the right front wheel 32. The left front wheel 31 and the right front wheel 32 are arranged in a left-and-right direction of the body frame 21. Of the pair of left and right front mudguards 223, a first front mudguard 227 is disposed directly above the left front wheel 31. Of the pair of left and right front mudguards 223, a second front mudguard 228 is disposed directly above the right wheel 32. The left front wheel 31 is supported by the left shock absorber 33. The right front wheel 32 is supported by the right shock absorber 34.

Figure 5:
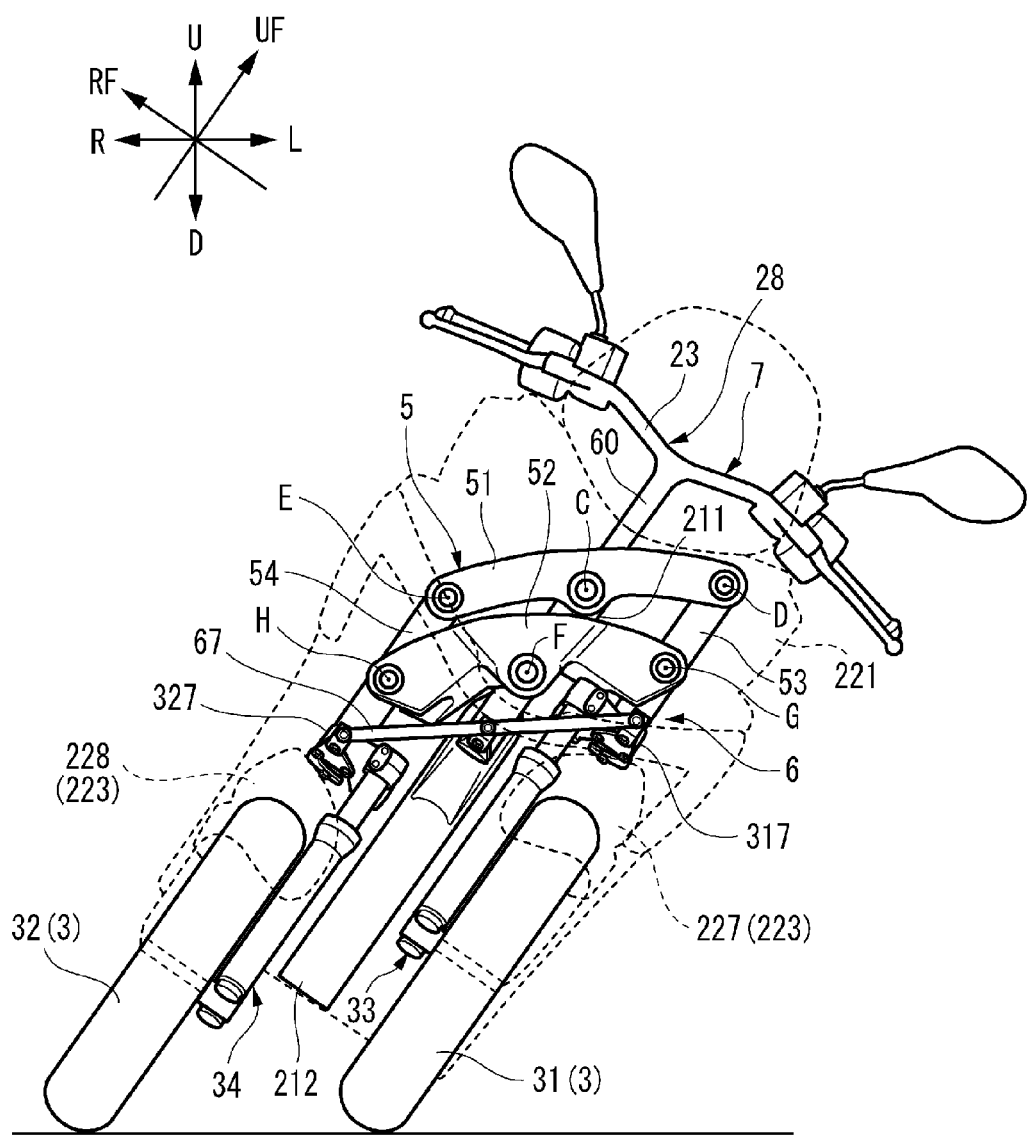
FIG. 5 is a front view of the front portion of the vehicle in a state where the vehicle shown in FIG. 1 is caused to lean.

In this description, the "left-and-right direction of the body frame 21" denotes a direction that intersects at right angles or perpendicular or substantially perpendicular to an axial direction of the headstock 211 in a front view of the vehicle 1. An up-and-down direction of the body frame 21 denotes a direction which extends in an axial direction of the headstock 211 in the front view of the vehicle 1. For example, the up-and-down direction of the body frame 21 coincides with the axial direction of the headstock 211. As shown in FIG. 2, in the vehicle 1 is in the upright state, the right direction RF of the body frame 21 coincides with the right direction R of the horizontal direction in a front view of the vehicle 1. Because of this, only the rightward direction R in the horizontal direction is shown in FIG. 2. As shown in FIG. 5, in such a state that the vehicle 1 leans relative to a road surface, in the front view of the vehicle 1, the rightward direction RF of the body frame 21 does not coincide with the rightward direction R in the horizontal direction, and an upward direction UF of the body frame 21 does not coincide with an upward direction U in the vertical direction.

The left shock absorber 33 (an example of a left suspension device) is preferably a so-called telescopic shock absorber and dampens vibrations from a road surface. The left shock absorber 33 supports the left front wheel 31 at a lower portion thereof and absorbs an upward displacement of the left front wheel 31 in the up-and-down direction of the body frame 21. The left shock absorber 33 includes a first lower-side portion 33a and a first upper-side portion 33b. The left front wheel 31 is supported on the first lower-side portion 33a. The first lower-side portion 33a extends in the up-and-down direction, and a left wheel axle 314 is supported on a lower end side of the first lower-side portion 33a. The left wheel axle 314 supports the left front wheel 31. The first upper-side portion 33b is disposed at an upper side of the first lower-side portion 33a in such a state that the first upper-side portion 33b is partially inserted into the first lower-side portion 33a. The first upper-side portion 33b moves relative to the first lower-side portion 33a in a direction in which the first lower-side portion 33a extends. An upper portion of the first upper-side portion 33b is fixed to a first bracket 317.

The first lower-side portion 33a and the first upper-side portion 33b define two telescopic elements that are aligned parallel in the front-and-rear direction and are connected together. This configuration prevents the first upper-side portion 33b from turning relative to the first lower-side portion 33a.

The right shock absorber 34 (an example of a right suspension device) is preferably a so-called telescopic shock absorber and dampens vibrations from a road surface. The left shock absorber 34 supports the right front wheel 32 at a lower portion thereof and absorbs an upward displacement of the right front wheel 32 in the up-and-down direction of the body frame 21. The right shock absorber 34 includes a second lower-side portion 34a and a second upper-side portion 34b. The right front wheel 32 is supported on the second lower-side portion 34a. The second lower-side portion 34a extends in the up-and-down direction, and a right wheel axle 324 is supported on a lower end side of the second lower-side portion 34a. The right wheel axle 324 supports the right front wheel 32. The second upper-side portion 34b is disposed at an upper side of the second lower-side portion 34a in such a state that the second upper-side portion 34b is partially inserted into the second lower-side portion 34a. The second upper-side portion 34b moves relative to the second lower-side portion 34a in a direction in which the second lower-side portion 34a extends. An upper portion of the second upper-side portion 34b is fixed to a second bracket 327.

The second lower-side portion 34a and the second upper-side portion 34b define two telescopic elements that are aligned parallel in the front-and-rear direction and are connected together. This configuration prevents the second upper-side portion 34b from turning relative to the second lower-side portion 34a.

The wheel turning operation transmission mechanism 6 is disposed above the left front wheel 31 and the right front wheel 32. The wheel turning operation transmission mechanism 6 includes a steering member 28 by which the rider inputs a steering effort or a steering force. The steering member 28 includes the steering shaft 60 and a handlebar 23 that is provided at an upper end portion of the steering shaft 60.

The steering shaft 60 is supported on the headstock 211 between the left shock absorber 33 and the right shock absorber 34 in the left-and-right direction of the body frame 21. Additionally, the steering shaft 60 turns about a middle steering axis Y3 that extends in the up-and-down direction of the body frame 21. The steering shaft 60 is disposed so that the steering shaft 60 is partially inserted into the headstock 211 and extends substantially in the up-and-down direction. The steering shaft 60 is able to be turned relative to the headstock 211. The steering shaft 60 is turned in association with the rider turning the handlebar 23.

The wheel turning operation input mechanism 6 turns the left shock absorber 33 about a left steering axis Y1 that extends in the up-and-down direction and turns the right shock absorber 34 about a right steering axis Y2 that is parallel to the left steering axis Y1 in association with the turning of the steering shaft 60 which is triggered in response to the operation of the handlebar 23.

The wheel turning operation transmission mechanism 6 includes, in addition to the steering member 28, a first transmission plate 61, a second transmission plate 62, a third transmission plate 63, a first joint 64, a second joint 65, a third joint 66, a tie-rod 67, the first bracket 317, and the second bracket 327. The wheel turning operation transmission mechanism 6 transmits a steering effort or a steering force with which the handlebar 23 is controlled to the first bracket 317 and the second bracket 327 via those constituent members.

The first transmission plate 61 is disposed at the center in the vehicle's width direction and is connected to the steering shaft 60 so as not to turn relative to the steering shaft 60. The first transmission plate 61 turns as the steering shaft 60 turns.

The second transmission plate 62 is connected to a left side portion 53 of the link mechanism 5, which will be described below, so as to turn relatively. The second transmission plate 62 is fixed to the first bracket 317. The second transfer plate 62 is disposed below the first bracket 317. The second transmission plate 62 is disposed on the left of the first transmission plate 61.

The third transmission plate 63 is connected to a right side portion 54 of the link mechanism 5, which will be described below, so as to turn relatively. The third transmission plate 63 is disposed laterally symmetrical with the second transmission plate 62 around the first transmission plate 61. The third transmission plate 63 is fixed to the second bracket 327. The third transfer plate 63 is positioned below the second bracket 327.

The first joint 64 is disposed at a front portion of the first transmission plate 61. The first joint 64 is supported by a turning shaft that extends in the up-and-down direction so as to turn relative to the first transmission plate 61. The second joint 65 is disposed at a front portion of the second transmission plate 62. The second joint 65 is supported by a turning shaft that extends in the up-and-down direction so as to turn relative to the second transmission plate 62. The third joint 66 is disposed at a front portion of the third transmission plate 63. The third joint 66 is supported by a turning shaft that extends in the up-and-down direction so as to turn relative to the third transmission plate 63. The first joint 64, the second joint 65, and the third joint 66 each include a shaft portion that extends in the front-and-rear diction at a front portion thereof.

The tie rod 67 extends in the vehicle's width direction. The tie-rod 67 is supported so as to turn relative to the shaft portions that extend in the front-and-rear direction at the front portions of the first joint 64, the second joint 65, and the third joint 66. This tie-rod 67 is a portion of the wheel turning operation transmission mechanism 6 and moves so as to maintain a parallel relationship with a lower cross portion 52, which will be described below, when the body frame 21 leans.

The wheel turning operation transmitting mechanism 6 that is configured in the manner described above transmits a steering force transmitted from the steering member 28 to the tie-rod 67 via the first transmission plate 61 and the first joint 64. This causes the tie rod 67 to be displaced either leftward or rightward. The steering effort transmitted to the tie rod 67 is transmitted from the tie rod 67 to the first bracket 317 by way of the second transmission plate 62 and the second joint 65 and is also transmitted from the tie rod 67 to the second bracket 327 by way of the third transmission plate 63 and the third joint 66. As a result, the first bracket 317 and the second bracket 327 are turned in the direction in which the tie-rod 67 is displaced.

In this preferred embodiment, the link mechanism 5 preferably uses a four-joint parallel link system (also, called a parallelogram link).

The link mechanism 5 is disposed below the handlebar 23. The link mechanism 5 is connected to the headstock 211 of the body frame 21. The link mechanism 5 includes an upper cross portion 51, a lower cross portion 52, the left side portion 53, and the right side portion 54 as a configuration which enables the vehicle 1 to lean. Additionally, the link mechanism 5 includes the first bracket 317 and the left shock absorber 33 as a configuration that is connected to a lower portion of the left side portion 53 so as to lean together with the left side portion 53. Further, the link mechanism 5 includes the second bracket 327 and the right shock absorber 34 as a configuration that is connected to a lower portion of the right side portion 54 so as to lean together with the right side portion 54.

The right side portion 54 supports an upper portion of the right shock absorber 34 so as to turn about a right steering axis Y2 that extends in the up-and-down direction of the body frame 21. The left side portion 53 supports an upper portion of the left shock absorber 33 so as to turn a left steering axis Y1 that is parallel to the right steering axis Y2.

The upper cross member 51 supports at a right end portion thereof an upper portion of the right side portion 54 so as to turn about an upper right axis E that extends in the front-and-rear direction of the body frame 21, supports at a left end portion thereof an upper portion of the left side portion 53 so as to turn about an upper left axis D that is parallel to the upper right axis E, and is supported at a middle portion thereof on the body frame 21 so as to turn about an upper middle axis C that is parallel to the upper right axis E and the upper left axis D. The lower cross member 52 supports at aright end portion thereof a lower portion of the right side portion 54 so as to turn about a lower right axis H that is parallel to the upper right axis E, supports at a left end portion thereof a lower portion of the left side portion 53 so as to turn about a lower left axis G that is parallel to the upper left axis D, and is supported at a middle portion thereof on the body frame 21 so as to turn about a lower middle axis F that is parallel to the upper middle axis C.

The upper cross portion 51 includes a plate-shaped member 512 which is provided in front of the headstock 211 and extends in the vehicle's width direction. The plate-shaped member 512 is supported on the headstock 211 by a support portion that is located at a center in the left-and-right direction and turns relative to the headstock 211 about an upper middle axis C that extends in the front-and-rear direction.

A left end of the upper cross portion 51 is connected to the left side portion 53 by a supporting portion. The upper cross portion 51 turns relative to the left side portion 53 about an upper left axis D that extends in the front-to-rear direction. A right end of the upper cross portion 51 is connected to the right side portion 54 by a connecting portion. The upper cross portion 51 turns relative to the right side portion 54 about an upper right axis E that extends in the front-to-rear direction.

The lower cross portion 52 is supported on the headstock 211 via the support portion and turns around the lower middle axis F extending in the front-and-rear direction. The lower cross portion 52 is disposed below the upper cross portion 51. The lower cross portion 52 has substantially the same widthwise length as that of the upper cross portion 51 in relation to the vehicle's width direction and is disposed parallel to the upper cross portion 51.

The lower cross portion 52 includes a pair of plate-shaped members 522, 522 that extend in the vehicle's width direction. The pair of plate-shaped members 522, 522 hold the headstock 211 therebetween in the front-and-rear direction. The pair of plate-shaped members 522, 522 is connected integrally to each other by a middle portion 523. The middle portion 523 may be integral with or separated from the pair of the plate-shaped members 522, 522. A left end of the lower cross portion 52 is connected to the left side portion 53 by a supporting portion. The lower cross portion 52 turns relative to the left side portion 53 about the lower left axis G that extends substantially in the front-and-rear direction. A right end of the lower cross portion 52 is connected to the right side portion 54 by a supporting portion. The lower cross portion 52 turns relative to the right side portion 54 about the lower right axis H that extends substantially in the front-and-rear direction.

The left side portion 53 is disposed directly on the left of the headstock 211 and extends parallel to the direction in which the headstock 211 extends. The left side portion 53 is disposed directly above the left front wheel 31 and above the left shock absorber 33. The left side portion 53 is connected to the first bracket 317 at the lower portion thereof and is attached to the first bracket 317 so as to turn about the left steering axis Y1. The left side portion 53 supports the upper portion of the left shock absorber 33 so as to turn around the left steering axis Y1.

The right side portion 54 is disposed directly on the right of the headstock 211 and extends in the direction in which the headstock 211 extends. The right side portion 54 is disposed directly above the right front wheel 32 and above the right shock absorber 34. The right side portion 54 is connected to the second bracket 327 at the lower portion thereof and is attached to the second bracket 327 so as to turn about the right steering axis Y2. The right side portion 54 supports the upper portion of the right shock absorber 34 so as to turn around the right steering axis Y1.

In this manner, the upper cross portion 51, the lower cross portion 52, the left side portion 53, and the right side portion 54 are connected together in such a posture that the upper cross portion 51 and the lower cross portion 52 become parallel to each other and that the left side portion 53 and the right side portion 54 become parallel to each other.

Figure 4:
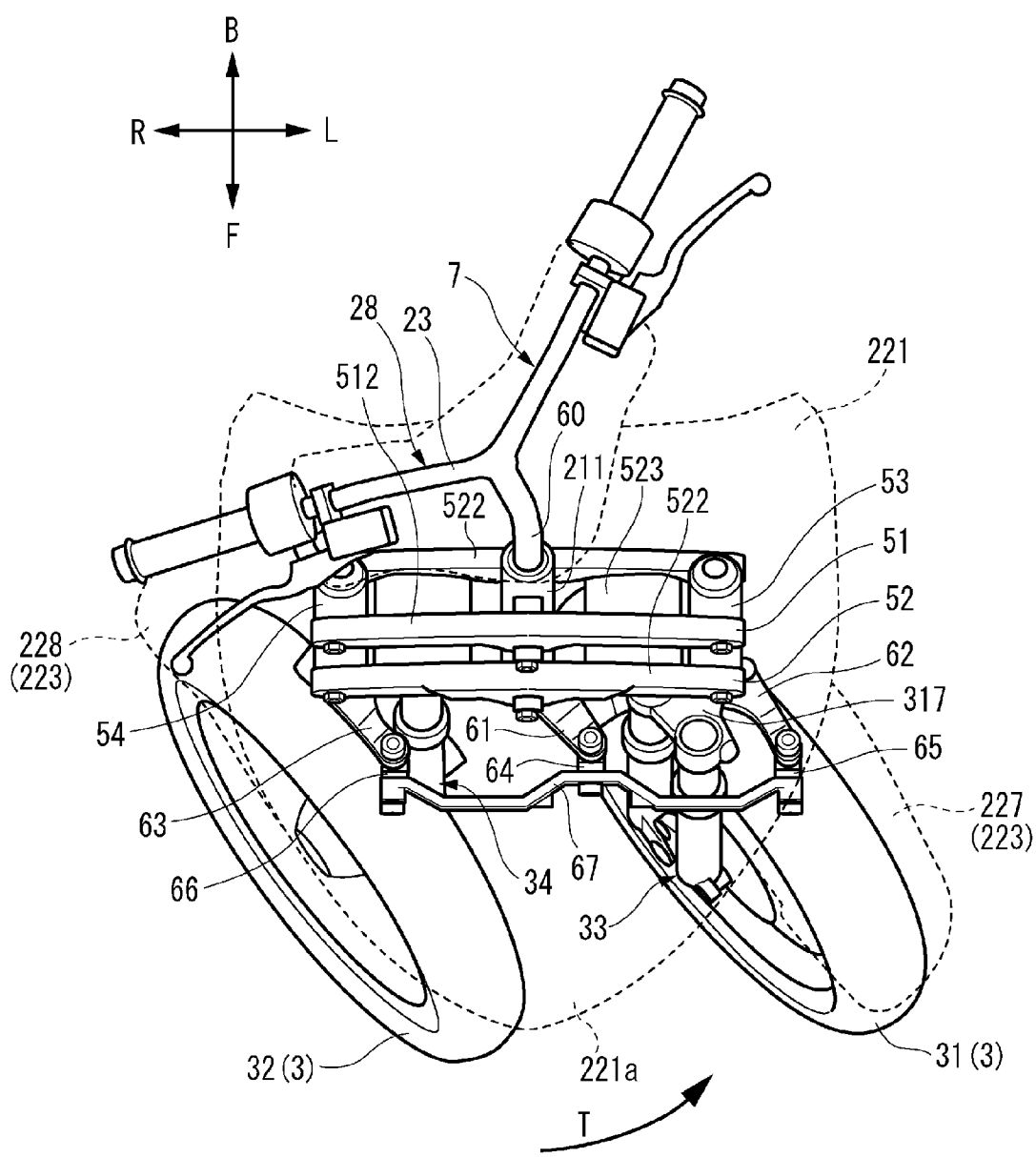
FIG. 4 is a plan view of the front portion of the vehicle in a state where the vehicle shown in FIG. 1 is steered.

FIG. 4 is a figure for explaining the steering operation of the vehicle 1 and is a plan view of the front portion of the vehicle 1 in a state where the vehicle 1 is steered.

As shown in FIG. 4, when the handlebar 23 is turned in the left-and-right direction, the wheel turning operation transmission mechanism 6 of the steering mechanism 7 is activated to operate, so that a steering operation is performed. When the steering shaft 60 turns as a result of the handlebar 23 being turned, the first transmission plate 61 turns as the steering shaft 60 turns. In particular, the front wheels 3 are turned by the wheel turning operation transmission mechanism 6 which moves in response to the turning of the steering shaft 60.

For example, when the steering shaft 60 turns in a direction indicated by an arrow T in FIG. 4, the tie-rod 67 moves leftward and rearward in association with the turning of the first transmission plate 61. As this occurs, the first transmission plate 61 is allowed to turn relative to the first joint 64 by the turning shaft that extends in the up-and-down direction of the first joint 64, and the tie-rod 67 moves to the left rear while maintaining its posture. The second transmission plate 62 and the third transmission plate 63 turn in the direction indicated by the arrow T about the left side portion 53 and the right side portion 54, respectively, as the tie-rod 67 moves leftward and rearward. As this occurs, the second transmission plate 62 turns relative to the second joint 65 about the rotating shaft of the second joint 65 that extends in the up-and-down direction, and the third transmission plate 63 turns relative to the third joint 66 about the rotating shaft of the third joint 66 that extends in the up-and-down direction.

When the second transmission plate 62 and the third transmission plate 63 turn in the direction indicated by the arrow T, the first bracket 317 and the second bracket 327 turn in the direction indicated by the arrow T. When the first bracket 317 and the second bracket 327 turn in the direction indicated by the arrow T, the left front wheel 31 turns about the left steering axis Y1 (refer to FIG. 2) via the left shock absorber 33, and the right front wheel 32 turns about the right steering axis Y2 (refer to FIG. 2) via the right shock absorber 34.

FIG. 5 is a figure for explaining the leaning operation of the vehicle 1 and is a front view of the front portion of the vehicle 1 in a state where the vehicle 1 is caused to lean.

As shown in FIG. 5, the vehicle 1 leans to the left or right as the link mechanism 5 operates. The operation of the link mechanism 5 means that the individual members (the upper cross portion 51, the lower cross portion 52, the left side portion 53 and the right side portion 54) that activate a leaning operation in the link mechanism 5 turn relatively about their connecting points as axes so as to change the shape of the link mechanism 5.

In the link mechanism 5 of this preferred embodiment, for example, the upper cross portion 51, the lower cross portion 52, the left side portion 53, and the right side portion 54 which define a rectangular or substantially rectangular shape in the front view of the vehicle 1 being in the upright state turn to change their shape into a parallelogram shape in such a state that the vehicle leans. The link mechanism 5 performs a leaning operation in association with the relative turning operation of the upper cross portion 51, the lower cross portion 52, the left side portion 53, and the right side portion 54 to cause the left front wheel 31 and the right front wheel 32 to lean accordingly.

For example, when the rider causes the vehicle 1 to lean to the left, the headstock 211 leans relative to the vertical direction. When the headstock 211 leans, the upper cross portion 51 turns relative to the headstock 211 about the upper middle axis C, and the lower cross portion 52 turns relative to the headstock 211 about the lower middle axis F. Then, the upper cross portion 51 moves farther leftward than the lower cross portion 52, and the left side portion 53 and the right side portion 54 lean from the vertical direction while being kept parallel to the headstock 211. The left side portion 53 and the right side portion 54 turn relative to the upper cross portion 51 and the lower cross portion 52 when the left side portion 53 and the right side portion 54 lean. Consequently, when the vehicle 1 is caused to lean, the left front wheel 31 and the right front wheel 32 that are supported on the left side portion 53 and the right side portion 54, respectively, lean while being kept parallel to the headstock 211 relative to the vertical direction as the left side portion 53 and the right side portion 54 lean.

In addition, during the leaning operation, the tie-rod 67 turns relative to the shaft portions of the first joint 64, the second joint 65, and the third joint 66 that extend in the front-and-rear direction. This allows the tie rod 67 to maintain its parallel posture to the upper cross portion 51 and the second cross portion 52 even though the vehicle 1 leans.

Figure 6:
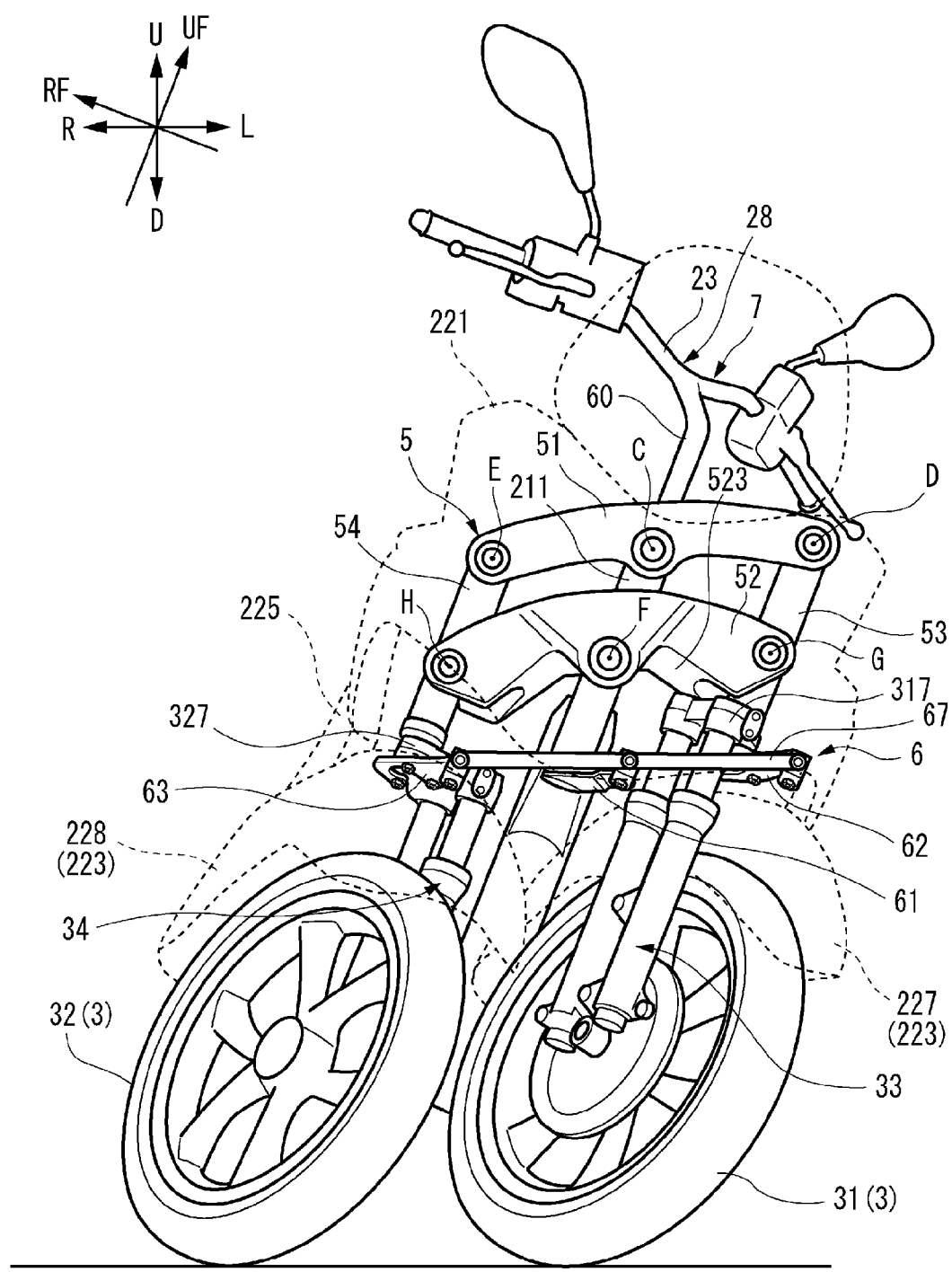
FIG. 6 is a front view of the front portion of the vehicle in a state where the vehicle shown in FIG. 1 is steered and is caused to lean.

FIG. 6 is a front view of the front portion of the vehicle 1 in a state where the vehicle 1 is steered and is caused to lean.

FIG. 6 shows a vehicle 1 which is steered to the left and is leaned to the left. When the vehicle 1 operates as illustrated in FIG. 6, the directions of the left front wheel 31 and the right front wheel 32 are changed by the steering operation, and both the left front wheel 31 and the right front wheel 32 are caused to lean together with the body frame 21 by the leaning operation. In this state, the upper cross portion 51, the lower cross portion 52, the left side portion 53, and the right side portion 54 of the link mechanism 5 are turned to change their shape into a parallelogram, so that the tie-rod 67 moves leftward or rightward, that is, in a direction in which the vehicle 1 is steered (leftward in FIG. 6) and rearward.

Next, with reference to FIGS. 7 to 14, a brake hose will be described which is provided on the vehicle 1 described above.

Figure 7:
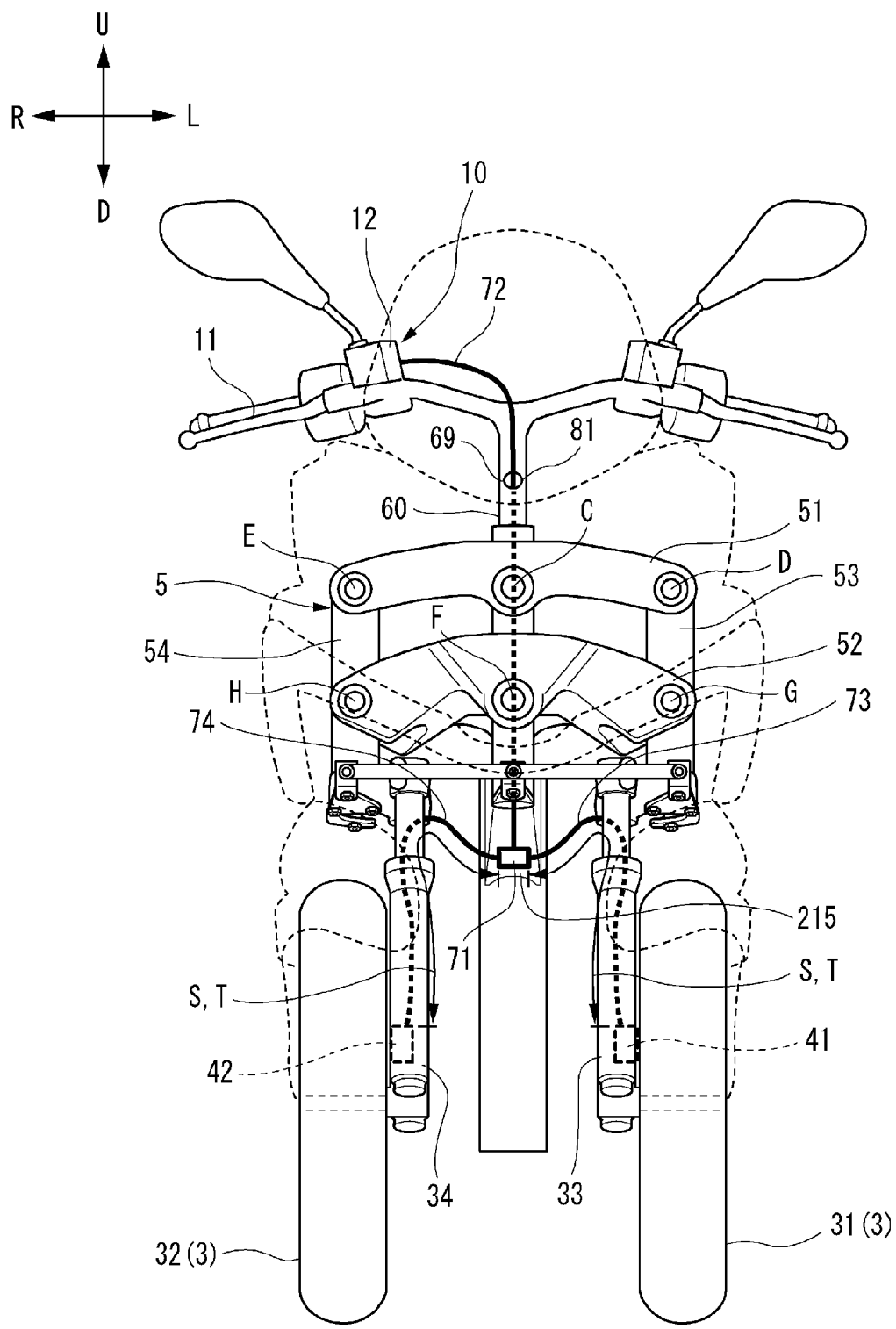
FIG. 7 is a front view of the vehicle that is in an upright state, shown together with a brake hose.
Figure 8:
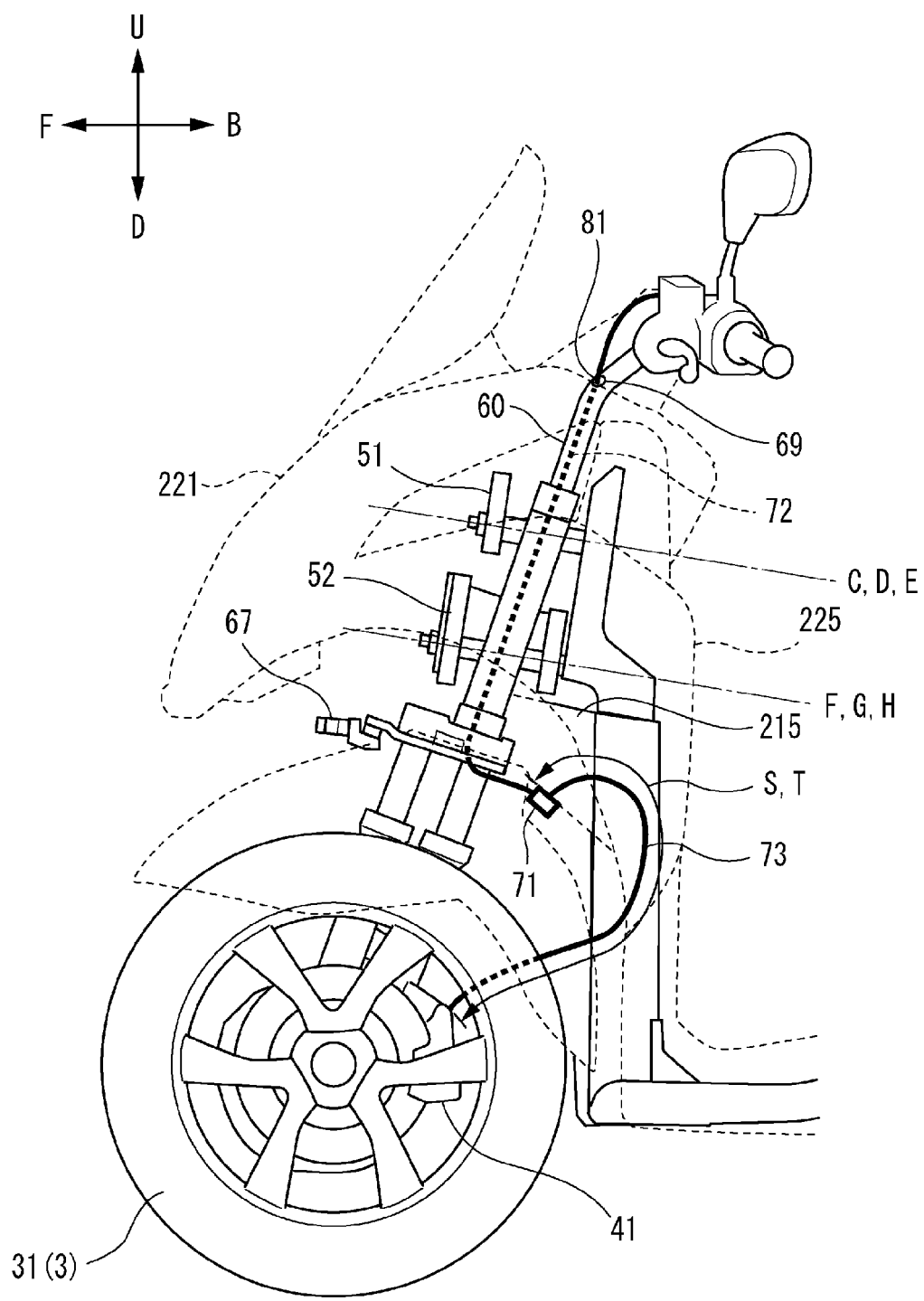
FIG. 8 is a side view of the vehicle shown in FIG. 7.
Figure 9:
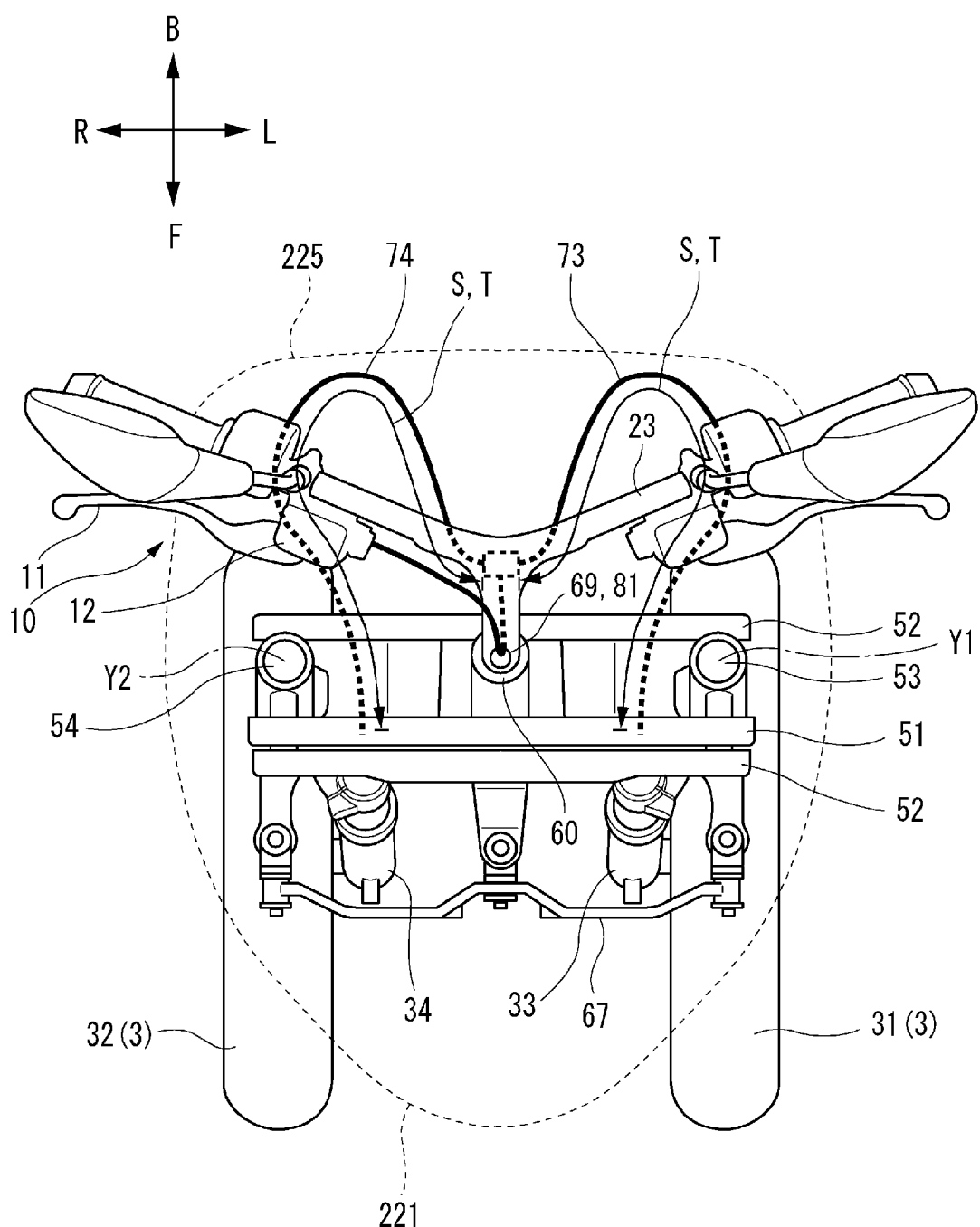
FIG. 9 is a plan view of the vehicle shown in FIG. 7.

Firstly, using FIGS. 7 to 9, the brake hose will be described when the vehicle 1 is in the upright state. The upright state of the vehicle 1 means a state in which the vehicle 1 does not lean and the front wheels are not turned. FIG. 7 is a front view of the vehicle 1 that is in the upright state, shown together with the brake hose. FIG. 8 is a side view of the vehicle 1 shown in FIG. 7. FIG. 9 is a plan view of the vehicle 1 shown in FIG. 7.

As shown in FIG. 7, a left brake caliper 41 is a brake device that is fixed to the left shock absorber 33 below the link mechanism 5. The left brake caliper 41 is provided on a rear side of a lower portion of the rear telescopic element of the two telescopic elements that are aligned back and forth in the front-and-rear direction (refer to FIG. 8).

The left brake caliper 41 includes brake pads, not shown. The left brake caliper 41 applies a braking force to the left front wheel 31 by holding a brake disc that rotates together with the left front wheel 31 by the brake pads therebetween.

Similarly, a right brake caliper 42 is a brake device that is fixed to the right shock absorber 34 below the link mechanism 5. The right brake caliper 42 is provided on a rear side of a lower portion of the rear telescopic element of the two telescopic elements that are aligned back and forth in the front-and-rear direction (refer to FIG. 8).

The right brake caliper 42 includes brake pads, not shown. The right brake caliper 42 applies a braking force to the right front wheel 32 by holding a brake disc that rotates together with the right front wheel 32 by the brake pads therebetween.

A brake controller 10 is attached to an upper portion of a right portion of the handlebar 23 above the link mechanism 5. The brake controller 10 includes a brake lever 11 and a master cylinder 12. Operating the brake lever 11 increases the pressure of a brake fluid in an interior of the master cylinder 12.

A branch block 71 (an example of a first restrictor) is fixed to a gusset (an example of the body frame) 215 that project from the down frame 212 to the front to support the headstock 211. This gusset 215 is located ahead and below the lower cross portion 52 and at a central portion in the front view of the vehicle 1.

The branch block 71 is a metallic block in an interior of which flow paths are provided. The branch block 71 prevents the movement of a brake hose. This branch block 71 is provided below the lower cross portion 52 in relation to the up-and-down direction of the body frame 21 and at the central portion of the body frame 21 in relation to the left-and-right direction thereof. It is noted that the central portion in the left-and-right direction of the body frame 21 means a centrally located portion of three areas that results when the vehicle 1 is divided in the left-and-right direction into three areas of a right portion, a central portion, and a left portion in a front view of the vehicle 1.

An opening 69 is provided in an upper portion of the steering shaft 60 on a turning axis of the steering shaft 60. A second restrictor 81 that fixes an upstream-side brake hose 72 so as not to allow it to move is provided in the opening 69. The second restrictor 81 is provided on the steering shaft 60 above the upper cross portion 51 in relation to the up-and-down direction of the body frame 21. It is noted that the second restrictor 81 may be provided on the handlebar 23 that turns together with the steering shaft 60 in a position lying above the upper cross portion 51.

A brake hose (an example of a brake controlling operation transmission member) connects the master cylinder 12 to the left brake caliper 41 and the master cylinder 12 to the right brake caliper 42. The brake hose is preferably a flexible rubber tube, for example. The brake hose transmits a brake controlling operation that is inputted into the brake controller 10 to the left brake caliper 41 and the right brake caliper 42.

The brake hose starts from the master cylinder 12, passes through the interior of the steering shaft 60, and branches off below the link mechanism 5 into left and right brake hose portions that extend to the left and right. Then, the left and right brake hose portions extend downward along the left shock absorber 33 and the right shock absorber 34 to connect to the brake calipers 41, 42, respectively. In the following description, in relation to the brake hose, a side facing the master cylinder 12 will, from time to time, be called an upstream side, and a side facing the brake calipers 41, 42 will, from time to time, be called a downstream side.

The pressure of the brake fluid in the master cylinder 12 is transmitted to the right brake caliper 42 and the left brake caliper 41 by way of the brake hose. When the brake fluid under high pressure in an interior of the brake hose is applied to the right brake caliper 42, the right brake caliper 42 applies a braking force to the right front wheel 32. When the brake fluid under high pressure in the interior of the brake hose is applied to the left brake caliper 41, the left brake caliper 41 applies a braking force to the left front wheel 31.

A brake hose runs from the master cylinder 12 to the branch block 71 to connect them to each other. The brake hose branches off at the branch block 71 into brake hose portions that extend toward the right brake caliper 42 and the left brake caliper 41. An end portion of the brake hose that runs from the master cylinder 12 to the branch block 71 is connected to the branch block 71, and this branch block 71 prevents the movement of the end portion of the brake hose.

In the following description, of the brake hose, the portion extending from the master cylinder 12 to the branch block 71 will be called an upstream side brake hose 72. In addition, of the brake hose, the brake hose portion extending from the branch block 71 to the right brake caliper 42 will be called a right downstream-side brake hose 74. Further, of the brake hose, the brake hose portion extending from the branch block 71 to the left brake caliper 41 will be called a left downstream-side brake hose 73.

As shown in FIGS. 7 to 10, the upstream-side brake hose 72 that extends from the master cylinder 12 extends to the left along the handlebar 23, is bent downward at an upper end of the steering shaft 60, and is restrained by the second restrictor 81. Further, the upstream-side brake hose 72 is inserted into the interior of the steering shaft 60 from the opening 69.

The upstream-side brake hose 72 that is inserted through the steering shaft 60 is passed through the interior of the steering shaft 60 downward in the up-and-down direction and is exposed to the outside from a lower end of the steering shaft 60. The upstream-side brake hose 72 that is exposed from the steering shaft 60 is bent toward the rear to be connected to the branch block 71 that is fixed to the gusset 215.

The left downstream-side brake hose 73 extends from the branch block 71 to the left and rear. The left downstream-side brake hose 73 is curved to expand toward the rear and thereafter extends downward to connect to the left brake caliper 41.

The right downstream-side brake hose 74 extends from the branch block 71 to the right and rear. The right downstream-side brake hose 74 is curved to expand toward the rear and thereafter extends downward to connect to the right brake caliper 42.

Figure 10:
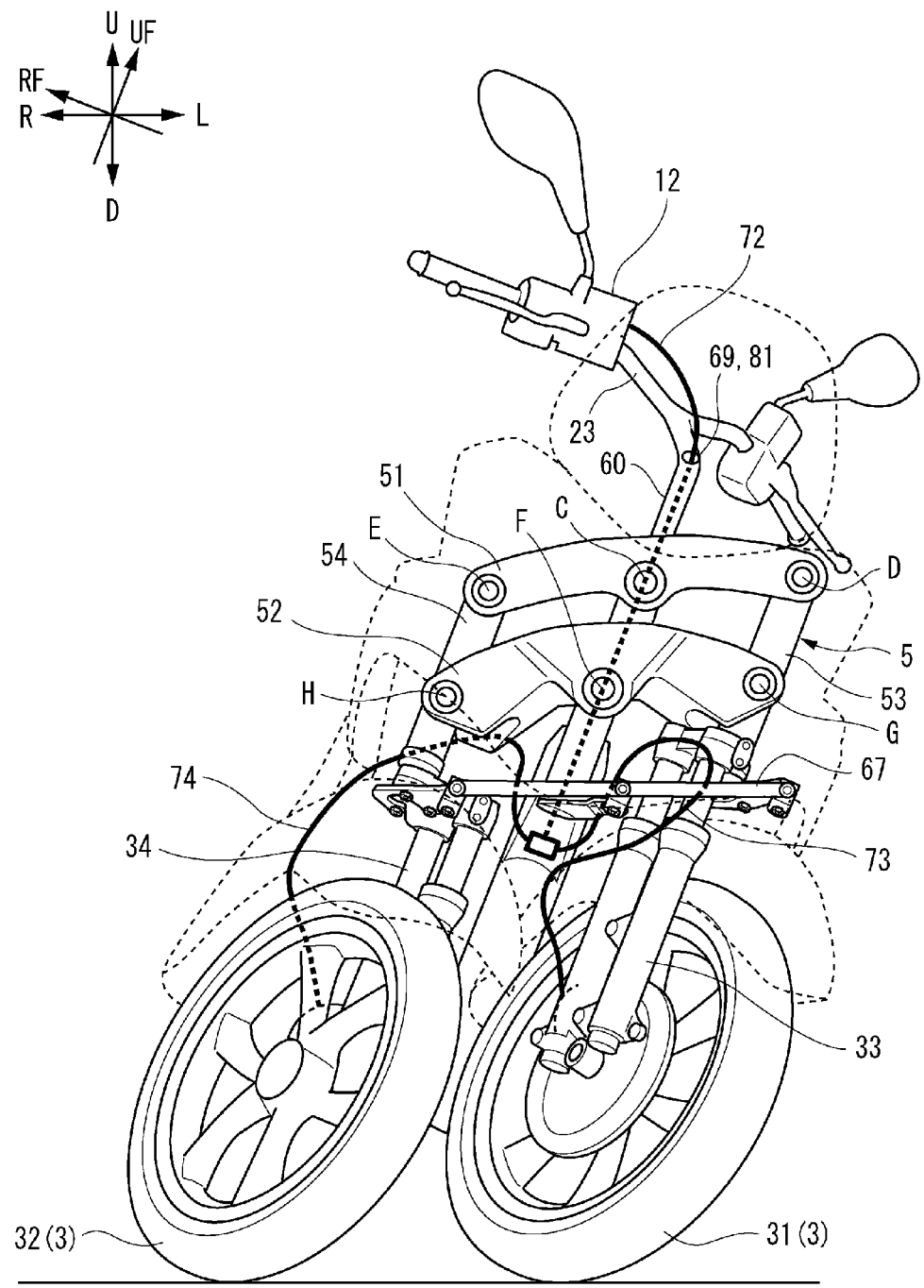
FIG. 10 is a front view of the vehicle shown in FIG. 7 showing a state in which the vehicle is caused to lean and front wheels are turned.

FIG. 10 is a front view of the vehicle 1 showing a state in which the vehicle 1 is caused to lean and front wheels 3 are turned.

When the vehicle 1 is caused to lean as shown in FIG. 10 from the upright state shown in FIG. 7, the relative positions of the master cylinder 12 and the left brake caliper 41 and the relative positions of the master cylinder 12 and the right brake caliper 42 change. The brake hose includes leaning associated deforming portions S that deform in response to the leaning of the body frame 21 so as to follow the changes of the relative positions. The leaning associated deforming portions S deflect, bend or twist when the vehicle 1 is caused to lean.

When the front wheels 3 are turned as shown in FIG. 10 from the upright state shown in FIG. 7, the relative positions of the master cylinder 12 and the left brake caliper 41 and the relative positions of the master cylinder 12 and the right brake caliper 42 change. Because of this, the brake hose includes wheel turning associated deforming portions T that deform in response to the turning of the left shock absorber 33 and the right shock absorber 34 so as to maintain the connection of the master cylinder 12 with the brake calipers 41, 42 even though those relative positions change. The wheel turning associated portions T also deflect, bend or twist when the front wheels 3 are turned.

When the vehicle 1 is caused to lean and the front wheels 3 are turned in the manner described above, the link mechanism 5, the tie-rod 67, the left shock absorber 33, the right shock absorber 34, the front wheels 3 and the like are displaced relative to one another with respect to the steering shaft 60. The brake hose deforms so as to follow the relative displacements of those constituent members while preventing the interference thereof with those members.

While the vehicle 1 and the front wheels 3 are shown as being caused to lean and turned, respectively, in FIG. 10, to facilitate the understanding of deformations of the deforming portions, the leaning of the vehicle 1 and the turning of the front wheels 3 will be described separately.

Figure 11:
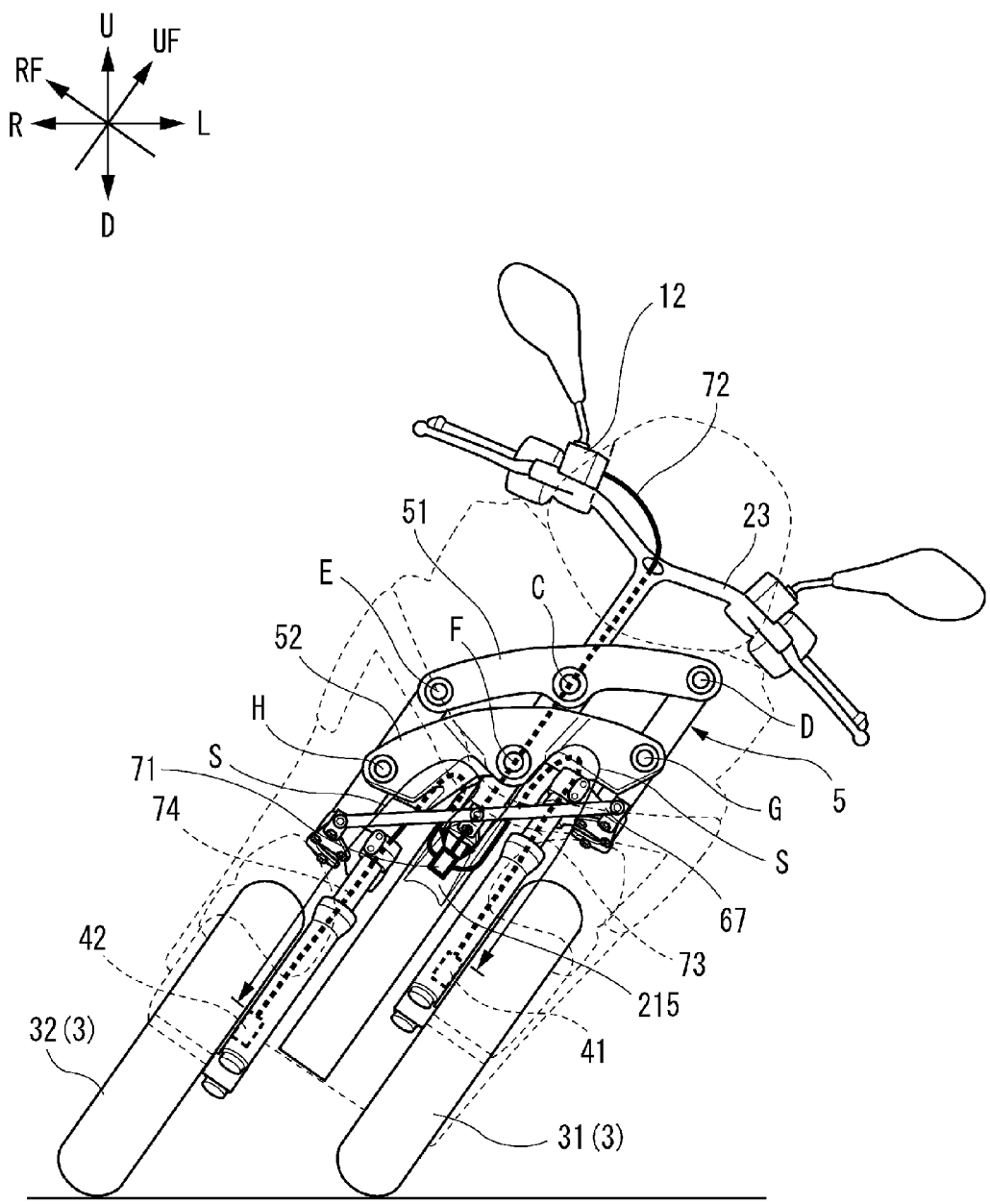
FIG. 11 is a front view of the vehicle shown in FIG. 7 showing a state in which the vehicle is caused to lean.
Figure 12:
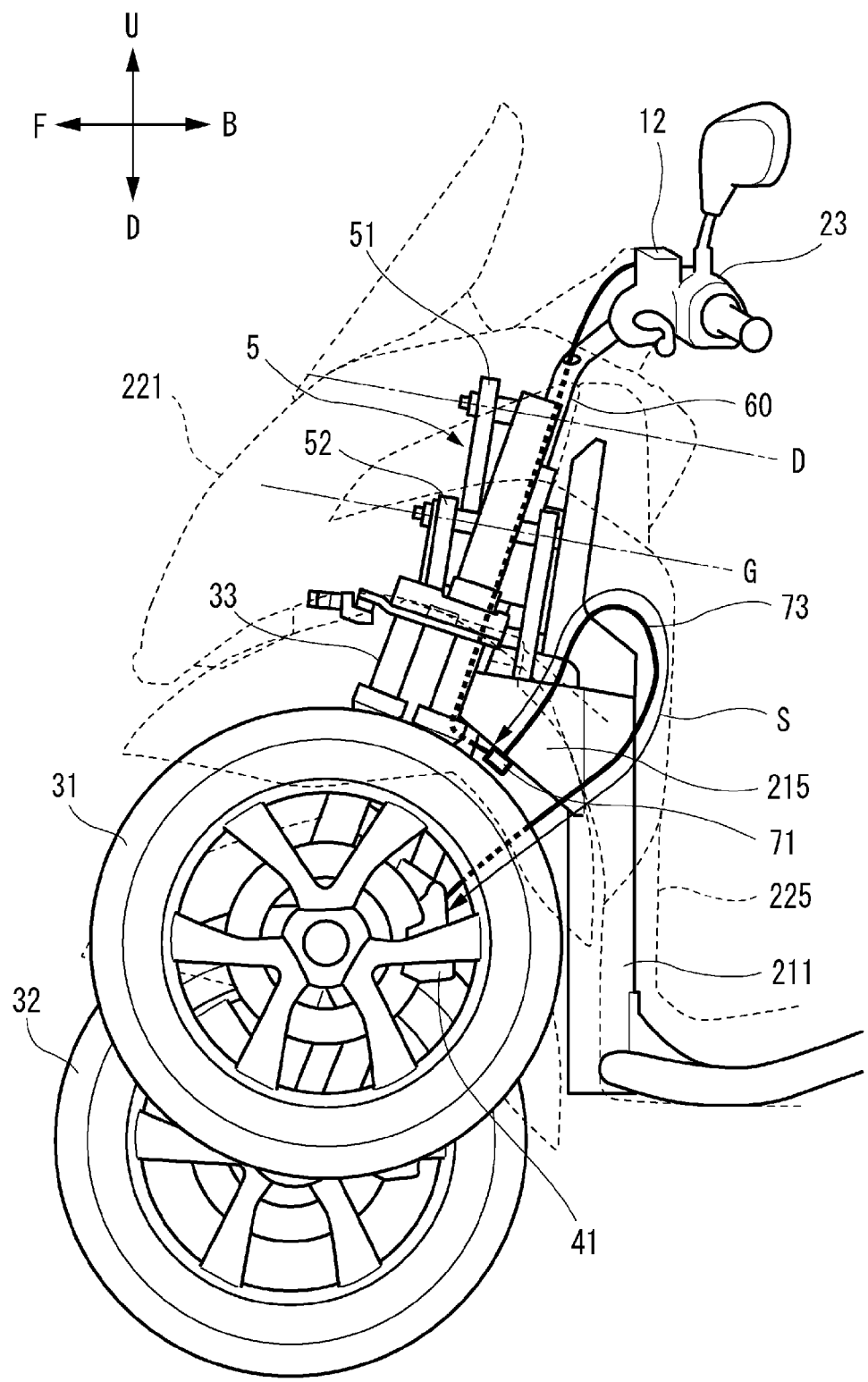
FIG. 12 is a side view of the vehicle shown in FIG. 11.

Firstly, using FIGS. 11 and 12, the leaning associated deforming portion S will be described. FIG. 11 is a front view of the vehicle 1 showing a state in which the vehicle 1 is caused to lean. FIG. 12 is a side view of the vehicle 1 shown in FIG. 11.

At least portions of the leaning associated deforming portions S are located below the lower cross portion 52 in relation to the up-and-down direction of the body frame 21 and between the branch block 71 that is provided at the central portion in the left-and-right direction of the body frame 21 and the left brake caliper 41 and between the branch block 71 and the right brake caliper 42.

In the vehicle 1 according to this preferred embodiment, the left downstream-side brake hose 73 and the right downstream-side brake hose 74 correspond to the leaning associated deforming portions S. When the vehicle 1 is caused to lean to the left as shown in FIG. 11 from the upright state shown in FIG. 7, the branch block 71 that is fixed to the gusset 215 moves toward the left brake caliper 41 and moves away from the right brake caliper 42. The leaning associated deforming portions S deform in such a way as to match the changes of the relative positions between the branch block 71, and the left brake caliper 41, and the right brake caliper 42.

More specifically, as shown in FIGS. 11 and 12, when the vehicle 1 is caused to lean, the left leaning associated deforming portion S deforms so that the radius of curvature of a curved portion that expands toward the rear is reduced in the left-and-right direction and the up-and-down direction. Additionally, the right leaning associated deforming portion S deforms so that the radius of curvature of a curved portion that expands toward the rear is increased in the left-and-right direction and the up-and-down direction.

Figure 13:
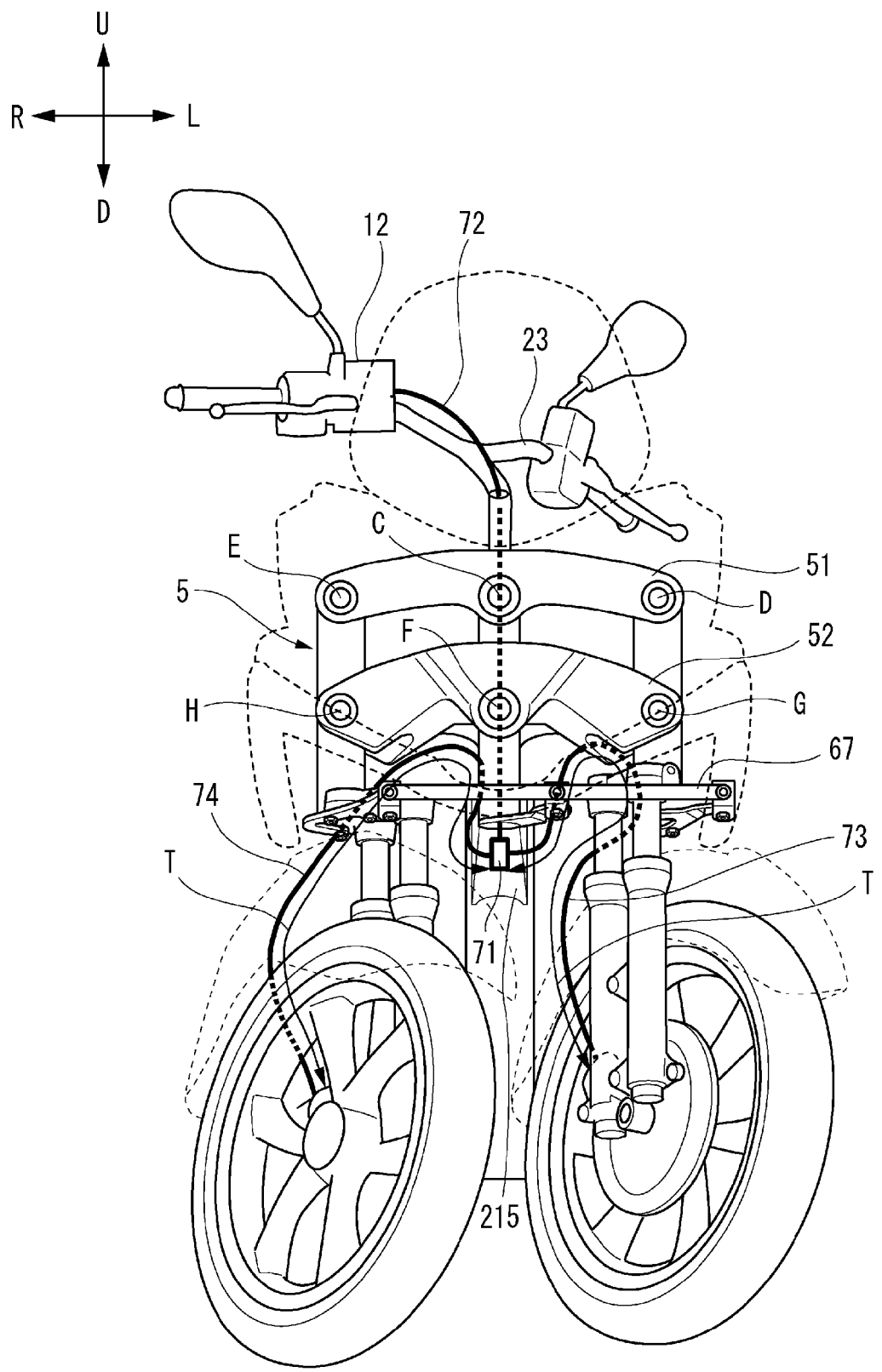
FIG. 13 is a front view of the vehicle shown in FIG. 7 showing a state in which the front wheels are turned.
Figure 14:
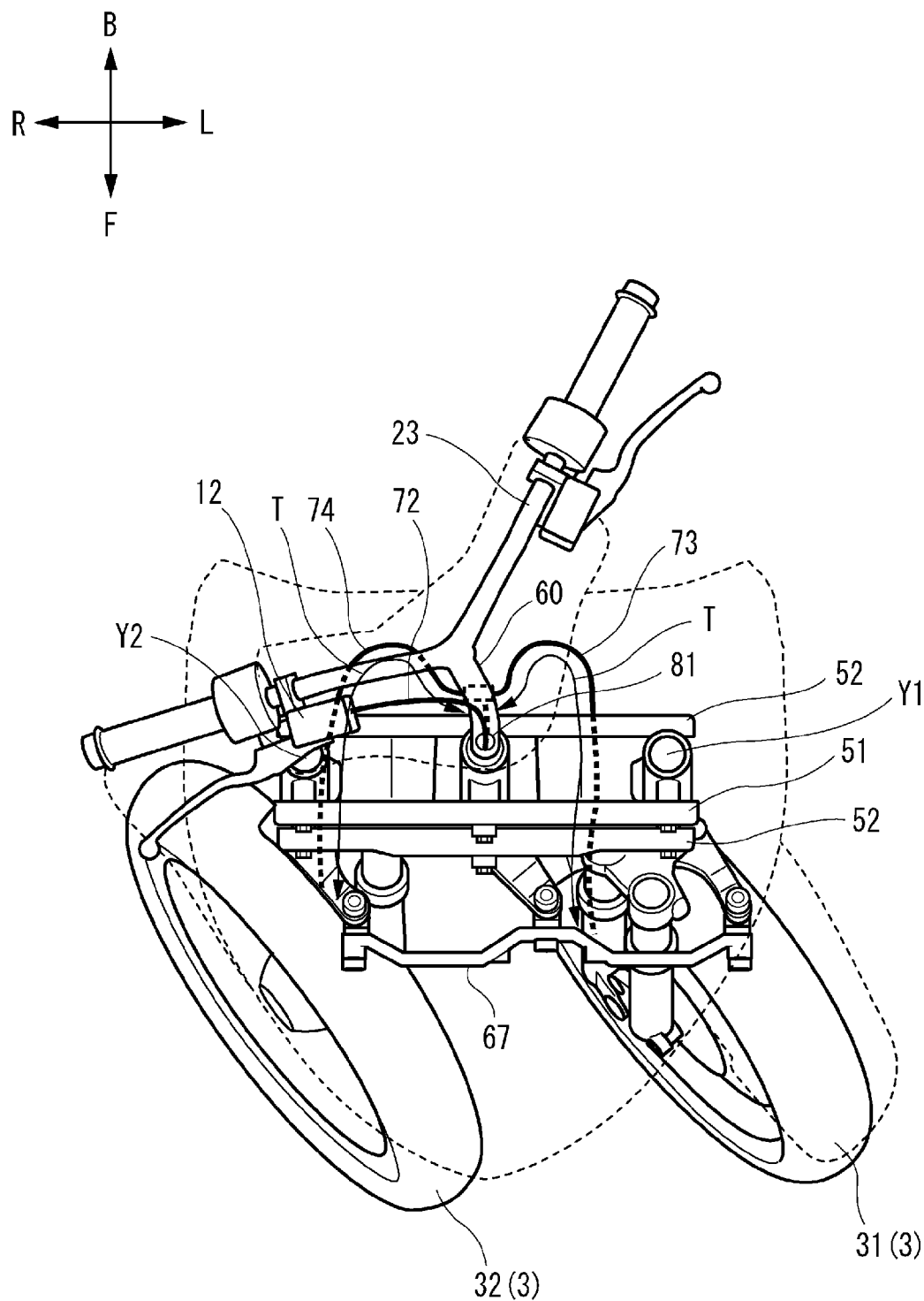
FIG. 14 is a plan view of the vehicle shown in FIG. 13.

Next, with reference to FIGS. 13 and 14, the wheel turning associated deforming portion T will be described. FIG. 13 is a front view of the vehicle 1 showing a state in which the front wheels 3 are turned. FIG. 14 is a plan view of the vehicle 1 shown in FIG. 13.

At least portions of the wheel turning associated deforming portions T are located below the lower cross portion 52 in relation to the up-and-down direction of the body frame 21 and between the branch block 71 and the left brake caliper 41 and between the branch block 71 and the right brake caliper 42.

In the vehicle 1 according to this preferred embodiment, the left downstream-side brake hose 73 and the right downstream-side brake hose 74 also correspond to the wheel turning associated deforming portions T. When the front wheels 3 are turned in such a way that the travelling direction is oriented to the left as shown in FIG. 13 from the upright state shown in FIG. 7, as shown in FIGS. 13 and 14, the left brake caliper 41 moves toward the branch block 71 and the right brake caliper 42 moves away therefrom. In association with these movements of the left and right brake calipers 41, 42, the left wheel turning associated deforming portion T (the left downstream-side brake hose 73) deforms so that the radius of curvature of a curved portion that expands to the rear is reduced in the left-and-right direction. Additionally, the right wheel turning associated deforming portion T (the right downstream-side brake hose 74) deforms so that the radius of curvature of a curved portion that expands to the rear is increased in the left-and-right direction.

In this preferred embodiment, the right downstream-side brake hose 74 and the left downstream-side brake hose 73 also function individually as a suspension-turning-associated deforming portion that deforms in response to the operation of the left shock absorber 33 and the right shock absorber 34. When the right shock absorber 34 and the left shock absorber 33 are activated to operate, increasing the relative distances between the axle shaft of the right front wheel 32 and the axle shaft of the left front wheel 31 and the branch block 71, the suspension-turning-associated deforming portions deform so as to extend rectilinearly. Additionally, when the relative distances between the axle shaft of the right front wheel 32 and the axle shaft of the left front wheel 31 and the branch block 71 are reduced to be shorter, the suspension-turning-associated deforming portions are bent so that the radius of curvature of each of the suspension-turning-associated deforming portions is reduced in relation to the up-and-down direction.

When the link mechanism 5 is activated to operate as shown in FIG. 10, a right member that includes the right front wheel 32, the right brake device 42 (the right brake caliper) and the right shock absorber 34 turns about the lower right axis H that extends in the front-and-rear direction relative to the lower cross portion 52. When the link mechanism 5 is activated to operate, a left member that includes the left front wheel 31, the left brake device 41 (the left brake caliper), and the left shock absorber 33 turns about the lower left axis G that extends in the front-and-rear direction relative to the lower cross portion 52. Because of this, a space is provided between the lower cross portion 52 and the right member and the left member so as to prevent the interference therebetween, so that the space is secured to permit the operations of these members. When attempting to dispose an additional member in this space, a careful design is necessary so as to prevent the interference of the additional member with the other members, and hence, this space is a space where no additional member is desired to be disposed. Because of this, in general, the deforming portions of the brake controlling operation transmission member such as the brake hose are desired not to be disposed in those spaces.

In the vehicles of U.S. Design Pat. No. 547,242 and Catalogo parti di ricambio, MP3 300 ie LT Mod. ZAPM64102, Piaggio that have been described above, the deforming portions of the brake hose are collected at a location directly above the upper cross portion altogether. Because of this, the brake hose is laid out compactly.

In the vehicles of U.S. Design Pat. No. 547,242 and Catalogo parti di ricambio, MP3 300 ie LT Mod. ZAPM64102, Piaggio, however, although the brake hose itself is laid out compactly as described above, the front portion of the vehicle is enlarged in size.

Then, the inventor studied in detail the movement of the brake controlling operation transmission member and the operation of the link mechanism 5 with a view to finding out another method of preventing the interference of the brake controlling operation transmission member such as the brake hose with the link mechanism 5.

The inventor studied in detail the movement of the brake controlling operation transmission member and the operation of the link mechanism 5 with a view to finding out another method of preventing the interference of the brake controlling operation transmission member such as the brake hose with the link mechanism 5.

The link mechanism 5 includes the right side portion 54, the left side portion 53, the upper cross portion 51, and the lower cross portion 52.

The right side portion 54 supports an upper portion of the right shock absorber 34 so as to turn about a right steering axis Y2 that extends in the up-and-down direction of the body frame 21.

The left side portion 53 supports an upper portion of the left shock absorber 33 so as to turn a left steering axis Y1 that is parallel to the right steering axis Y2.

The upper cross portion 51 supports the upper portion of the right side portion 54 at the right end portion thereof so as to turn about the upper right axis E that extends in the front-and-rear direction of the body frame 21, supports the upper portion of the left side portion 53 at the left end portion thereof so as to turn about the upper left axis D that is parallel to the upper right axis E, and is supported on the body frame 21 at the middle portion thereof so as to turn about the upper middle axis C that is parallel to the upper right axis E and the upper left axis D.

The lower cross member 52 supports at a right end portion thereof a lower portion of the right side portion 54 so as to turn about a lower right axis H that is parallel to the upper right axis E, supports at a left end portion thereof a lower portion of the left side portion 53 so as to turn about a lower left axis G that is parallel to the upper left axis D, and is supported at a middle portion thereof on the body frame 21 so as to turn about a lower middle axis F that is parallel to the upper middle axis C.

When the link mechanism 5 is activated to operate, the right member that includes the right front wheel 32, the right brake device 42, and the right shock absorber 34 turns about the lower right axis H that extends in the front-and-rear direction relative to the lower cross portion 52. When the link mechanism 5 is activated to operate, the left member that includes the left front wheel 31, the left brake device 41, and the left shock absorber 33 turns about the lower left axis G that extends in the front-and-rear direction relative to the lower cross portion 52. Because of this, since the lower cross portion 52, the right member, and the left member are all turned about the axes that extend in the front-and-rear direction when the link mechanism 5 is activated to operate, they are displaced largely in the up-and-down and left-and-right directions but are not displaced largely in the front-and-rear direction. In particular, although the link mechanism 5 is activated to operate, the lower cross portion 52, the right member, and the left member are not displaced largely relative to each other in the front-and-rear direction.

The leaning associated deforming portion S is a portion of the brake controlling operation transmission member such as the brake hose that is located between positions that are fixed to two points (for example, one point on the lower cross portion 52 and one point on the brake device 41, 42) that are displaced relative to each other in association with the operation of the link mechanism 5. A portion that deforms when the relative positions of these two points in the up-and-down direction change largely is the leaning associated deforming portion S. Since the constituent members of the link mechanism 5 turn about the axes that extend in the front-and-rear direction, although the leaning associated deforming portion S has to change its shape or posture largely in the up-and-down direction, the leaning associated deforming portion S does not have to do so and changes its posture only a little in the other directions than the up-and-down direction. For example, by causing the brake controlling operation transmission member to deform along a plane that is perpendicular or substantially perpendicular to the front-and-rear direction when the distance between the two points is reduced in the up-to-direction to allow the two points to approach each other, the change in posture of the leaning associated deforming portion S in relation to the front-and-rear direction is small.

The inventor discovered, based on the knowledge obtained through the analysis above, a challenging layout in which the brake controlling operation transmission member and the lower cross portion 52, the right member, and the left member are positioned near each other with a view to preventing the interference of the brake controlling operation transmission member with the lower cross portion 52, the right member, and the left member.

According to the vehicle 1 of the present preferred embodiment, at least the portions of the leaning associated deforming portions S are located between the first restrictor 71 (the branch block) that is provided below the lower cross portion 52 in relation to the up-and-down direction of the body frame 21 and at the central portion in the left-and-right direction of the body frame 21 to prevent the movement of the brake controlling operation transmission member and the brake devices 41, 42. It is noted that the central portion in the left-and-right direction means a central portion produced by dividing the vehicle 1 in the left-and-right direction into three areas of a right portion, a central portion, and a left portion when looking at the vehicle from the front thereof.

Since the lower cross portion 52 turns, at the middle portion thereof, relative to the body frame 21 about the lower middle axis F that extends in the front-and-rear direction, when the link mechanism 5 is activated to operate, the right member that is supported at the right end portion of the lower cross portion 52 and the left member that is supported at the left end portion thereof are displaced largely relative to the first restrictor 71 that is located below the lower cross portion 52 and at the central portion in the left-and-right and up-and-down directions of the body frame 21 but are not displaced largely in the front-and-rear direction. In the event that the leaning associated deforming portions S are provided between the first restrictor 71 and the brake devices 41, 42 so as to deform along the plane that is perpendicular or substantially perpendicular to the front-and-rear direction, the leaning associated deforming portions deform largely in the up-and-down direction but do not deform largely in the front-and-rear direction.

According to this configuration, as shown in FIG. 11, the right member and the left member are displaced largely relative to the lower cross portion 52 in the up-and-down direction but are not displaced largely in the front-and-rear direction and the leaning associated deforming portions S are displaced largely in the up-and-down direction but are not displaced largely in the front-and-rear direction. Thus, the right member and the left member and the leaning associated deforming portions S tend to change their shapes or postures in similar directions. That the link mechanism and the leaning associated deforming portion tend to change their postures in the similar directions means that the directions in which the link mechanism and the leaning associated deforming portion change their postures largely and the directions in which they change their postures minimally are similar and that the timings at which the link mechanism and the leaning associated deforming portion change their postures are similar. Because of this, in the event that the first restrictor 71 is provided below the lower cross portion 52 and at the central portion in the left-and-right direction and the leaning associated deforming portions S are provided between the first restrictor 71 and the brake devices 41 42, even though the leaning associated deforming portions S are disposed near the lower cross portion 52, the right member and the left member, they are prevented from interfering with each other. In particular, since the leaning associated deforming portions S are provided in the space that is provided to permit the displacement of the right member and the left member as well as the lower cross portion 52, although the leaning associated deforming portions S are provided, the space provided to permit the displacement is prevented from being enlarged.

Because of this, the leaning associated deforming portions S are provided in the space that permits the displacement of the lower cross portion 52, the right member and the left member, so that the vehicle 1 is small in size while securing the space where to accommodate the brake controlling operation transmission member. This provides the vehicle 1 including the two front wheels and the body frame 21 that leans which prevents the enlargement in size of the front portion of the vehicle 1 while ensuring the degree of freedom in designing the suspension devices and the front wheels.

Additionally, the vehicle 1 according to this preferred embodiment includes the steering shaft 60 that is supported on the body frame 21 between the right shock absorber 34 and the left shock absorber 33 in the left-and-right direction of the body frame 21 so as to turn about the middle steering axis Y3 that extends in the up-and-down direction of the body frame 21, the handlebar 23 that is provided at the upper end portion of the steering shaft 60, and the wheel turning operation transmission mechanism 6 that turns the right shock absorber 34 about the right steering axis Y2 and turns the left shock absorber 33 about the left turning axis Y1 in association with the turning of the steering shaft 60 that is activated in response to the operation of the handlebar 23. The brake controlling operation transmission member includes the wheel turning associated deforming portions T that are configured to deform in response to the turning of the right shock absorber 34 and the left shock absorber 33, and at least the portions of the wheel turning associated deforming portions T are disposed below the lower cross portion 52 in relation to the up-and-down direction of the body frame 21 and between the first restrictor 71 (the branch block) and the brake devices 41, 42.

In case a portion of the brake controlling operation transmission member (the brake hose) that is located between positions that are fixed to two points (for example, one point on the lower cross portion 52 and one point on the brake device 41, 42) that are displaced largely relative to each other as the right front wheel 32 and the left front wheel 31 are turned is defined as the wheel turning associated deforming portion T, this wheel turning associated deforming portion T deforms when the relative positions of the two points change largely in the front-and-rear direction or the left-and-right direction. The right front wheel 32 turns about the right steering axis Y2, and the left front wheel 31 turns about the left steering axis Y1. Therefore, the wheel turning associated deforming portions T have to change their shapes or postures largely in the front-and-rear or the left-and-right direction but do not have to change their shapes or postures largely in the up-and-down direction. For example, in the event that the brake controlling operation transmission member is caused to deform along a plane that is perpendicular or substantially perpendicular to the up-and-down direction when the distance between the two points in the left-and-right direction or the front-and-rear direction is reduced to allow the two points to approach each other, the change in posture of the wheel turning associated deforming portion T is small in the up-and-down direction.

On the other hand, when the right front wheel 32 and the left front wheel 31 are turned, the right front wheel 32 turns about the right steering axis Y2 that extends in the up-and-down direction and the left front wheel 31 turns about the left steering axis Y1 that extends in the up-and-down direction. The right front wheel 32 and the left front wheel 31 move largely in the front-and-rear or left-and-right direction relative to the lower cross portion 52 but do not move largely in the up-and-down direction relative to the lower cross portion 52.

In this manner, the right front wheel 32 and the left front wheel 31 are displaced largely relative to the lower cross portion 52 in the front-and-rear or left-and-right direction but are not displaced largely in the up-and-down direction, and the wheel turning associated deforming portions T are also displaced largely in the front-and-rear or left-and-right direction but are not displaced largely in the up-and-down direction. In particular, as shown in FIG. 13, the relative displacement of the right and left front wheels 32, 31 to the lower cross portion 52 and the displacement of the wheel turning associated deforming portions T tend to be aligned in similar directions. Because of this, even though at least a portion of the wheel turning associated deforming portion T is provided below the lower cross portion 52, it is easy to prevent the interference of the wheel turning associated deforming portion T with the right front wheel 32 or the left front wheel 31. In this manner, it is possible to provide the wheel turning associated deforming portion T by using the space provided to permit the displacement of the right front wheel 32 or the left front wheel 31. In other words, even though the wheel turning associated deforming portions T are provided, the expansion of the space provided to permit the deformation of the wheel turning associated deforming portions T is prevented.

Further, the vehicle 1 according to this preferred embodiment includes the steering shaft 60 that is supported on the body frame 21 between the right shock absorber 34 and the left shock absorber 33 in the left-and-right direction of the body frame 21 so as to turn about the middle steering axis Y3 that extends in the up-and-down direction of the body frame 21, and the brake controlling operation transmission member is inserted through the interior of the steering shaft 60. The steering shaft 60 prevents the interference of the brake controlling operation transmission member that is inserted through the interior of the steering shaft 60 with the link mechanism 5 and the like. Additionally, since a separate space to dispose the brake controlling operation transmission member does not have to be provided by allowing the brake controlling operation transmission member to be inserted through the interior of the steering shaft 60 that is provided originally on the vehicle 1, the vehicle 1 is small in size.

Furthermore, the vehicle 1 according to this preferred embodiment includes the steering shaft 60 that is supported on the body frame 21 between the right shock absorber 34 and the left shock absorber 33 in the left-and-right direction of the body frame 21 so as to turn about the middle steering axis Y3 that extends in the up-and-down direction of the body frame 21, and the handlebar 23 that is provided at the upper end portion of the steering shaft 60, and the second restrictor 81 that prevents the movement of the brake controlling operation transmission member is provided on the steering shaft 60 or the member such as the handlebar 23 that turns together with the steering shaft 60 above the upper cross portion in the up-and-down direction of the body frame 21. As shown in FIG. 14, when the handlebar 23 is turned, the steering shaft 60 and the member that turns together with the steering shaft 60 turn about the middle steering axis Y3. Since the first restrictor 71 is provided below the lower cross portion 52 and at the center in the left-and-right direction, the portion of the brake controlling operation transmission member that is located between the first restrictor 71 and the second restrictor 81 extends in the up-and-down direction at the central portion in relation to the left-and-right direction of the body frame 21. This portion deforms so as to twist about the axis that extends in the up-and-down direction when the handlebar 23 is turned.

In particular, when the handlebar 23 is turned, the steering shaft 60 and the member that turns together with the steering shaft 60 turn about the middle steering axis Y3 that extends in the up-and-down direction, and the portion of the brake controlling operation transmission member that is located between the first restrictor 71 and the second restrictor 81 deforms about the axis that extends in the up-and-down direction. Since the steering shaft and the member that turns together with the steering shaft and the portion of the brake controlling operation transmission member tend to change their shapes or postures in similar directions, even in the event that they are disposed near each other, they are prevented from interfering with each other.

Additionally, since the portion of the brake controlling operation transmission member that is located between the first restrictor 71 and the second restrictor 81 deform in such a way as to twist about the axis that extends in the up-and-down direction, the space where the brake controlling operation transmission member is accommodated is small in size while permitting the deformation of the portion of the brake controlling operation transmission member.

Further, in the vehicle 1 according to this preferred embodiment, the portion of the brake controlling operation transmission member that is located between the second restrictor 81 and the first restrictor 71 is provided along the steering shaft 60.

Since the portion of the brake controlling operation transmission member that is located between the first restrictor 71 and the second restrictor 81 is allowed to deform about the middle steering axis Y3, the brake controlling operation transmission member is prevented from interfering with the steering shaft 60 and the member that turns together with the steering shaft 60, and the space where to accommodate the brake controlling operation transmission member is smaller in size while permitting the deformation of the portion of the brake controlling operation transmission member.

Thus, while the vehicle 1 has been described according to the first preferred embodiment, the position where the brake hose is disposed is not limited to that of the first preferred embodiment described above. Then, the second and third preferred embodiments will be described in which a brake hose is disposed in different positions. Vehicles 1 according to the second and third preferred embodiments differ from the vehicle 1 according to the first preferred embodiment described above in the position where the brake hose is disposed. Then, only different features will be described, and like reference numerals will be given to like or common members to those of the first preferred embodiment, so that the description of the like members will be omitted here.

Second Preferred Embodiment

Figure 15:
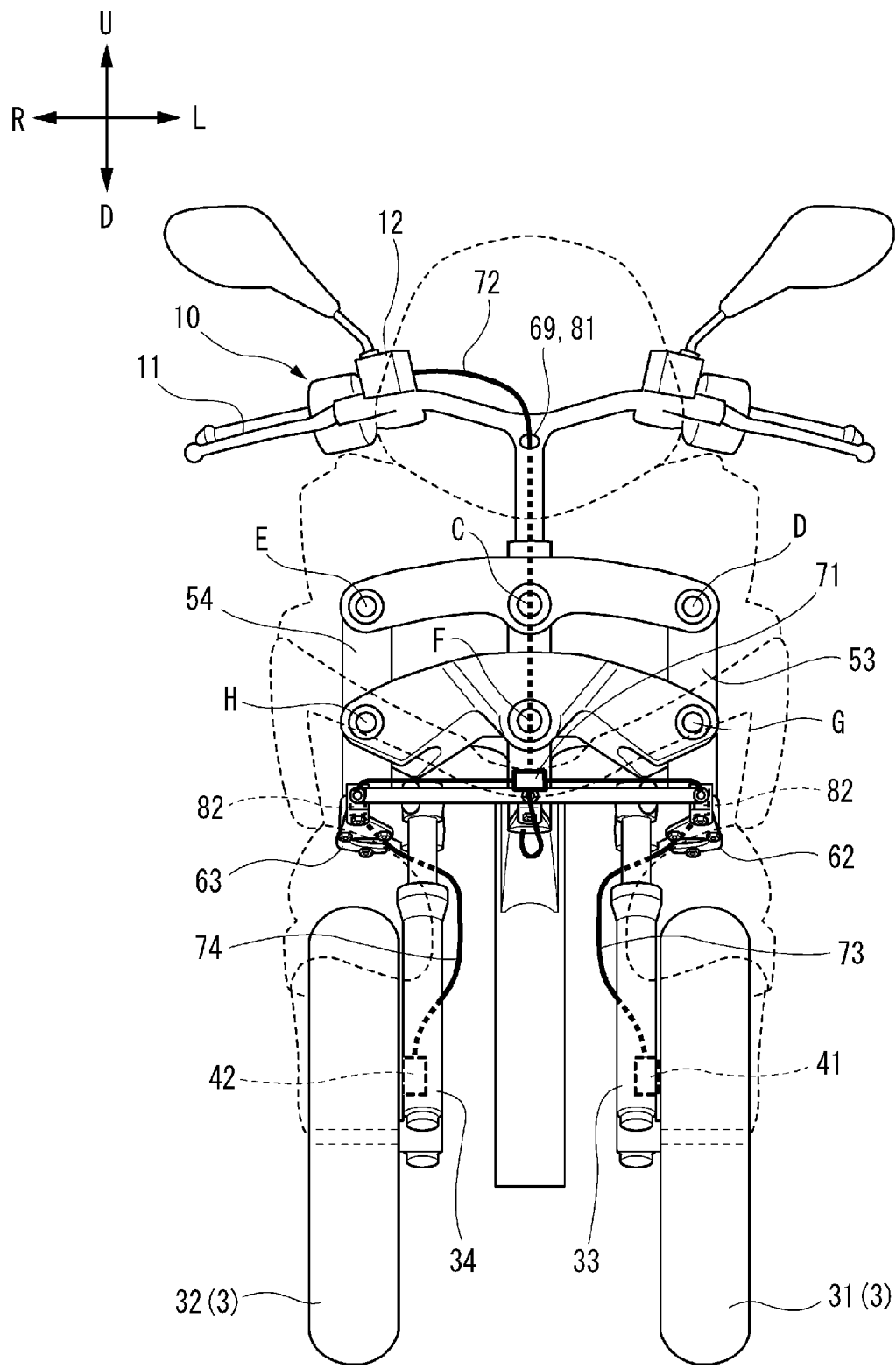
FIG. 15 is a front view of a vehicle according to a second preferred embodiment of the present invention in the upright state.
Figure 16:
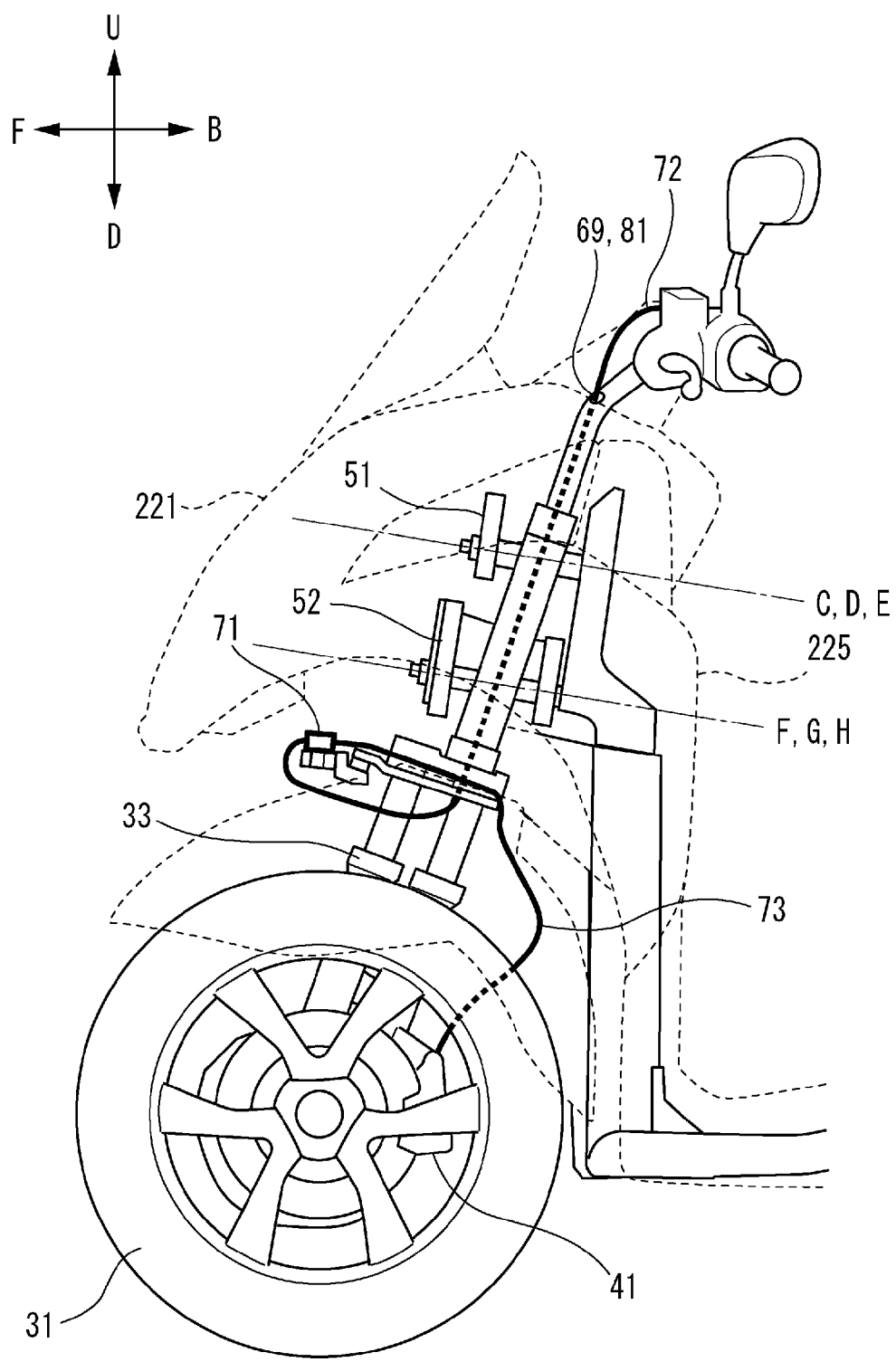
FIG. 16 is a side view of the vehicle shown in FIG. 15.
Figure 17:
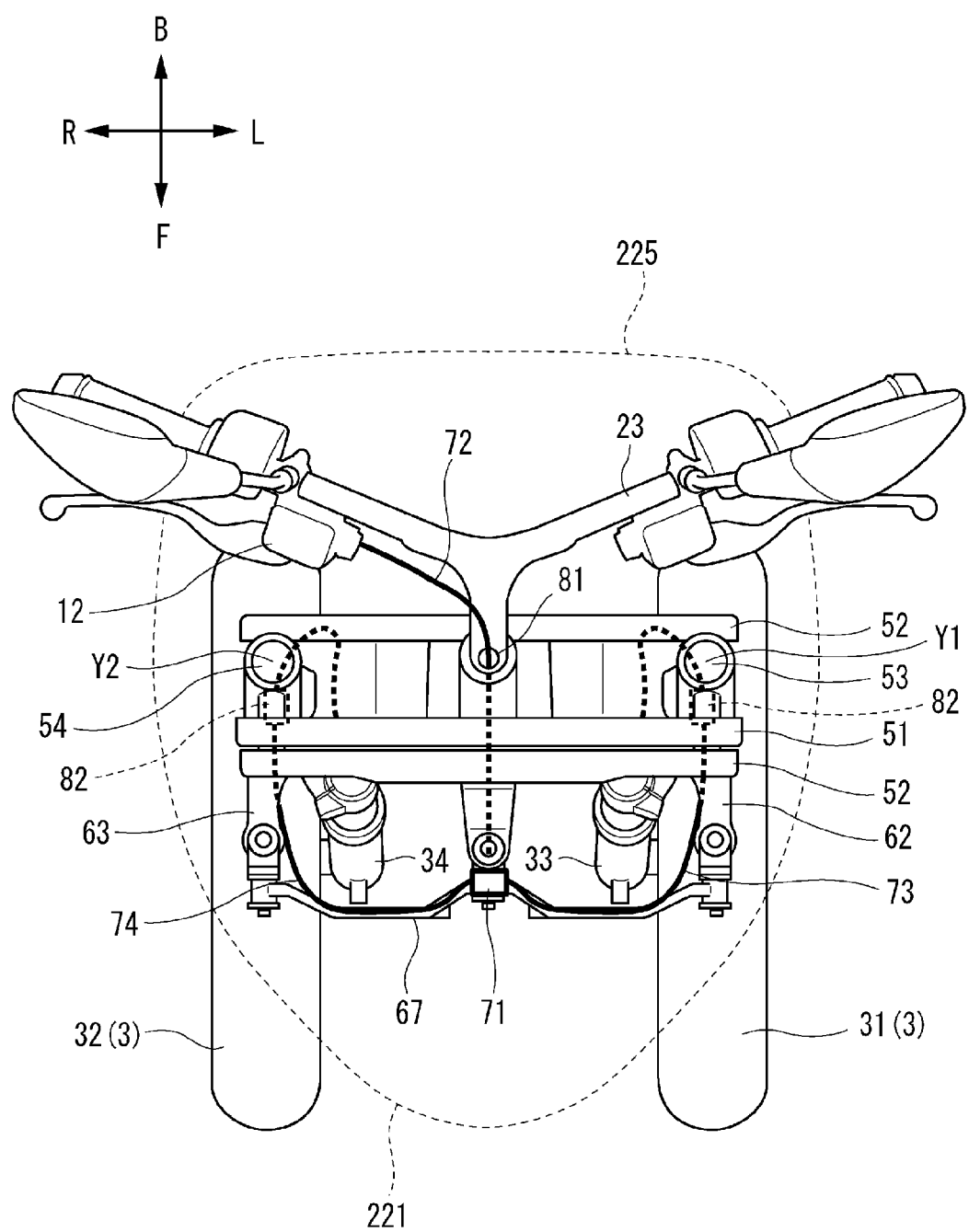
FIG. 17 is a plan view of the vehicle shown in FIG. 15.
Figure 18:
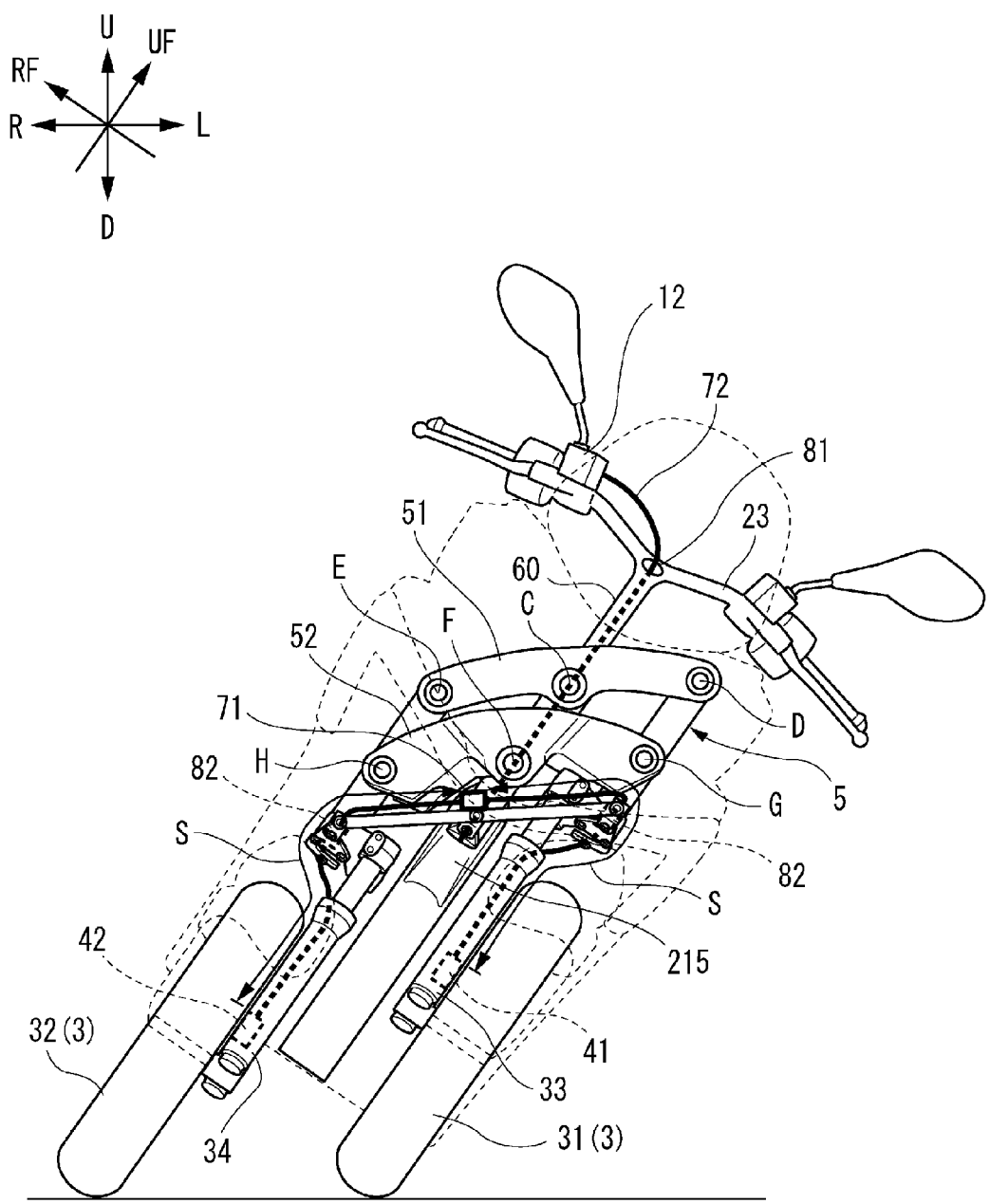
FIG. 18 is a front view of the vehicle shown in FIG. 15 showing a state where the vehicle is caused to lean.
Figure 19:
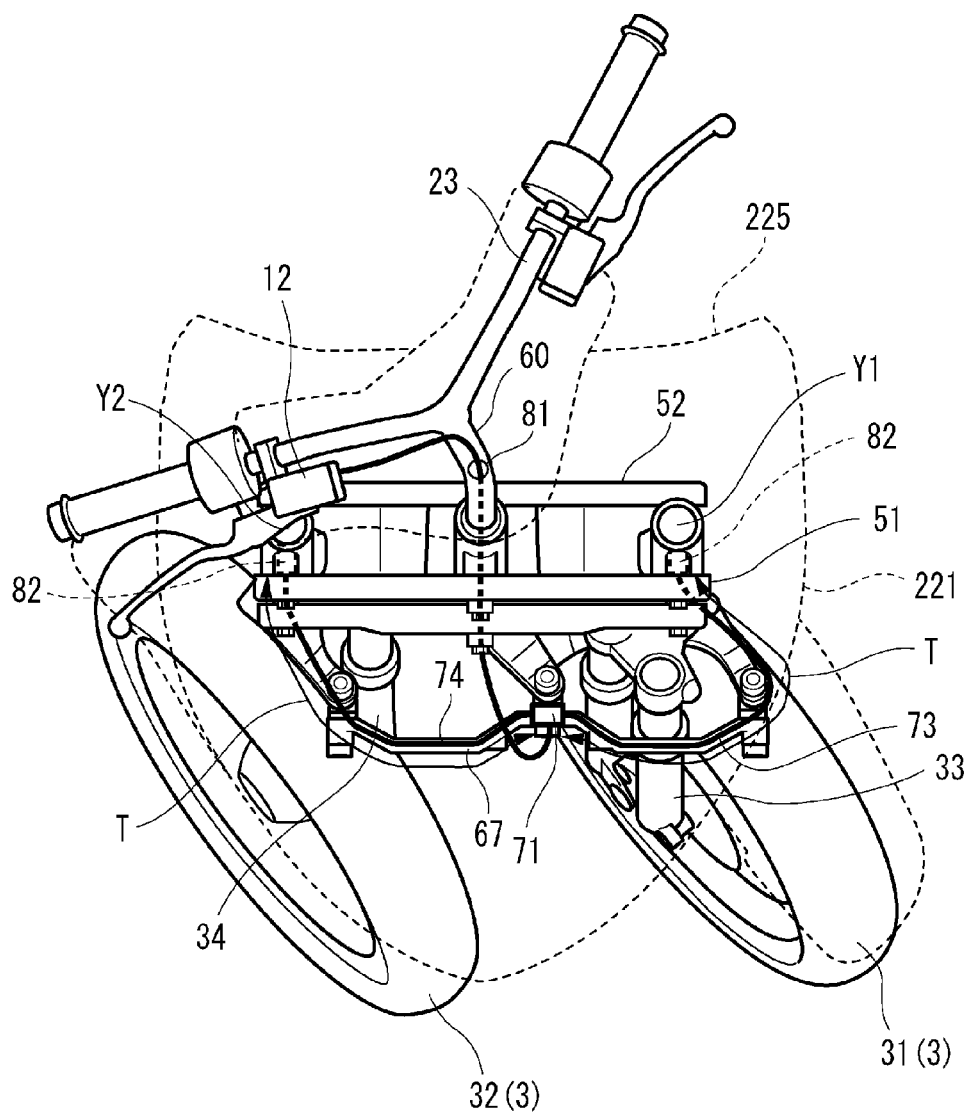
FIG. 19 is a plan view of the vehicle shown in FIG. 15 showing a state where front wheels are turned.

Firstly, with reference to FIGS. 15 to 19, a vehicle 1 according to a second preferred embodiment of the present invention will be described. FIG. 15 is a front view of the vehicle 1 according to the second preferred embodiment of the present invention in the upright state. FIG. 16 is a side view of the vehicle 1 shown in FIG. 15. FIG. 17 is a plan view of the vehicle 1 shown in FIG. 15. FIG. 18 is a front view of the vehicle 1 shown in FIG. 15 which shows a state in which the vehicle 1 is caused to lean. FIG. 19 is a plan view of the vehicle 1 shown in FIG. 15 which shows a state in which front wheels 3 are turned.

As shown in FIGS. 15 to 17, in this preferred embodiment, too, as with the first preferred embodiment, an upstream-side brake hose 72 that extends from a master cylinder 12 is restrained by a second restrictor 81 that is provided at an upper portion of a steering shaft 60 on a middle steering axis Y3. The upstream-side brake hose 72 is inserted through an interior of the steering shaft 60 from the second restrictor 81 to a lower end of the steering shaft 60.

The upstream-side brake hose 72 that is exposed from the lower end of the steering shaft 60 extends to the front and then extends upward while passing the front of a tie-rod 67 to connect to a branch block 71 that is fixed to an upper surface of the tie-rod 67. This branch block 71 is provided at a central portion of the tie-rod 67 in the front view of the vehicle 1. A left downstream-side brake hose 73 that connects to a left brake caliper 41 and a right downstream-side brake hose 74 that connects to a right brake caliper 42 extend from the branch block 71.

The left downstream-side brake hose 73 extends from the branch block 71 to the left along the tie-rod 67. The left downstream-side brake hose 73 is bent toward the rear near a left end portion of the tie-rod 67 and is restrained by a left third restrictor 82. The left downstream-side brake hose 73 extends downward from the left third restrictor 82 and is then curved so as to expand toward the rear to connect to the left brake caliper 41. This left third restrictor 82 is provided near a position where a left side portion 53 is connected to a second transmission plate 62.

A right downstream-side brake hose 74 extends from the branch block 71 to the right along the tie-rod 67. The right downstream-side brake hose 74 is bent toward the rear near a right end portion of the tie-rod 67 and is restrained by a right third restrictor 82. The right downstream-side brake hose 74 extends downward from the right third restrictor 82 and is then curved so as to expand toward the rear to connect to the right brake caliper 42. This right third restrictor 82 is provided near a position where a right side portion 54 is connected to a third transmission plate 63.

In this preferred embodiment, a section (the left downstream-side brake hose 73) extending from the branch block 71 to the left brake caliper 41 corresponds to a leaning associated deforming portion S, and a section (the right downstream-side brake hose 74) extending from the branch block 71 to the right brake caliper 42 corresponds to another leaning associated deforming portion S.

When the vehicle 1 is caused to lean to the left as shown in FIG. 18, in the front view of the vehicle 1, the left leaning associated deforming portion S (the left downstream-side brake hose 73) deforms so that an angle defined by the portion that extends to the left from the branch block 71 to the left third restrictor 82 and the portion that extends downward from the left third restrictor 82 to the left brake caliper 41 becomes smaller.

Additionally, with the vehicle 1 seen from the front thereof, the right leaning associated deforming portion S (the right downstream-side brake hose 74) deforms so that an angle defined by the portion that extends to the right from the branch block 71 to the right third restrictor 82 and the portion that extends downward from the right third restrictor 82 to the right brake caliper 42 becomes larger.

In the vehicle 1 of this preferred embodiment, portions extending from the branch block 71 to the third restrictors 82 correspond to wheel turning associated deforming portions T.

As shown in FIG. 19, when the front wheels 3 are turned so that the travelling direction of the vehicle 1 is oriented to the left, the branch block 71 moves to the left. When, the branch block 71 moves toward the left third restrictor 82 and moves away from the right third restrictor 82.

Because of this, the left downstream-side brake hose 73 deforms so that an angle defined by the portion that extends from the branch block 71 to the left along the tie-rod 67 and the portion that extends to the rear along the second transmission plate 62 becomes smaller. The right downstream-side brake hose 74 is bent so that an angle defined by the portion that extends from the branch block 71 to the right along the tie-rod 67 and the portion that extends to the rear along the third transmission plate 63 becomes larger.

In this way, in the vehicle 1 according to this preferred embodiment, too, at least portions of the leaning associated deforming portions S are located between the first restrictor 71 that is provided below a lower cross portion 52 in an up-and-down direction of a body frame 21 and at the central portion in a left-and-right direction of the body frame 21 to prevent the movement of the brake controlling operation transmission member and the brake devices 41, 42.

Because of this, the leaning associated deforming portions S are provided in the space that permits the displacement of the lower cross portion 52, the right member and the left member, so that the vehicle 1 is small in size while securing the space where to accommodate the brake controlling operation transmission member. This provides the vehicle 1 including the two front wheels and the body frame 21 that leans which prevents the enlargement in size of the front portion of the vehicle 1 while ensuring the degree of freedom in designing the suspension devices and the front wheels.

Further, according to the vehicle 1 of this preferred embodiment, the first restrictor 71 (the branch block) is provided on the tie-rod 67 that defines a portion of a wheel turning operation transmission mechanism 6 and that moves so as to maintain a parallel relationship with the lower cross portion 52 when the body frame 21 is caused to lean.

When the right front wheel 32 and the left front wheel 31 are turned, the wheel turning operation transmission mechanism 6 is activated to operate which includes the tie-rod 67 that moves so as to maintain the parallel relationship with the lower cross portion 52. When a link mechanism 5 is activated to operate, the tie-rod 67 of the wheel turning operation transmission mechanism 6 that moves to maintain the parallel relationship with the lower cross portion 52 is displaced. In particular, a portion of the wheel turning operation transmission mechanism 6 that moves to maintain the parallel relationship with the lower cross portion 52 moves both when the body frame 21 is caused to lean and when the right front wheel 32 and the left front wheel 31 are turned.

Then, in the event that the first restrictor 71 (the branch block) is provided on the tie-rod 67 of the wheel turning operation transmission mechanism 6 that moves to maintain the parallel relationship with the lower cross portion 52, it is easy to cause the brake controlling operation transmission member to deform in association with the leaning of the body frame 21 and the turning of the right front wheel 32 and the left front wheel 31. Because of this, even in the event that the leaning associated deforming portions S and the wheel turning associated deforming portions T are provided, the vehicle 1 is small in size while securing the space where to accommodate the brake controlling operation transmission member.

Third Preferred Embodiment

Figure 20:
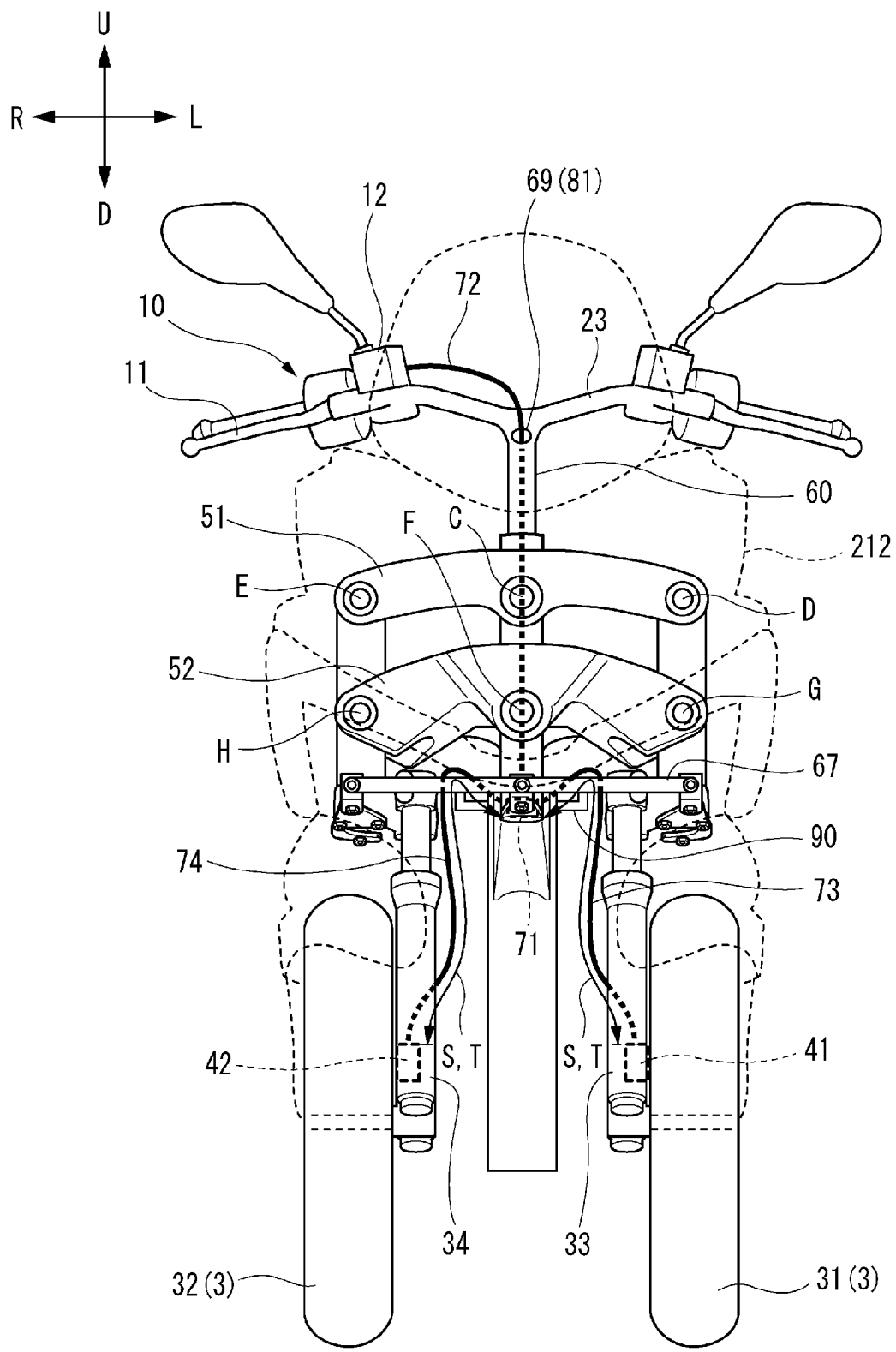
FIG. 20 is a front view of a vehicle according to a third preferred embodiment of the present invention in the upright state.
Figure 21:
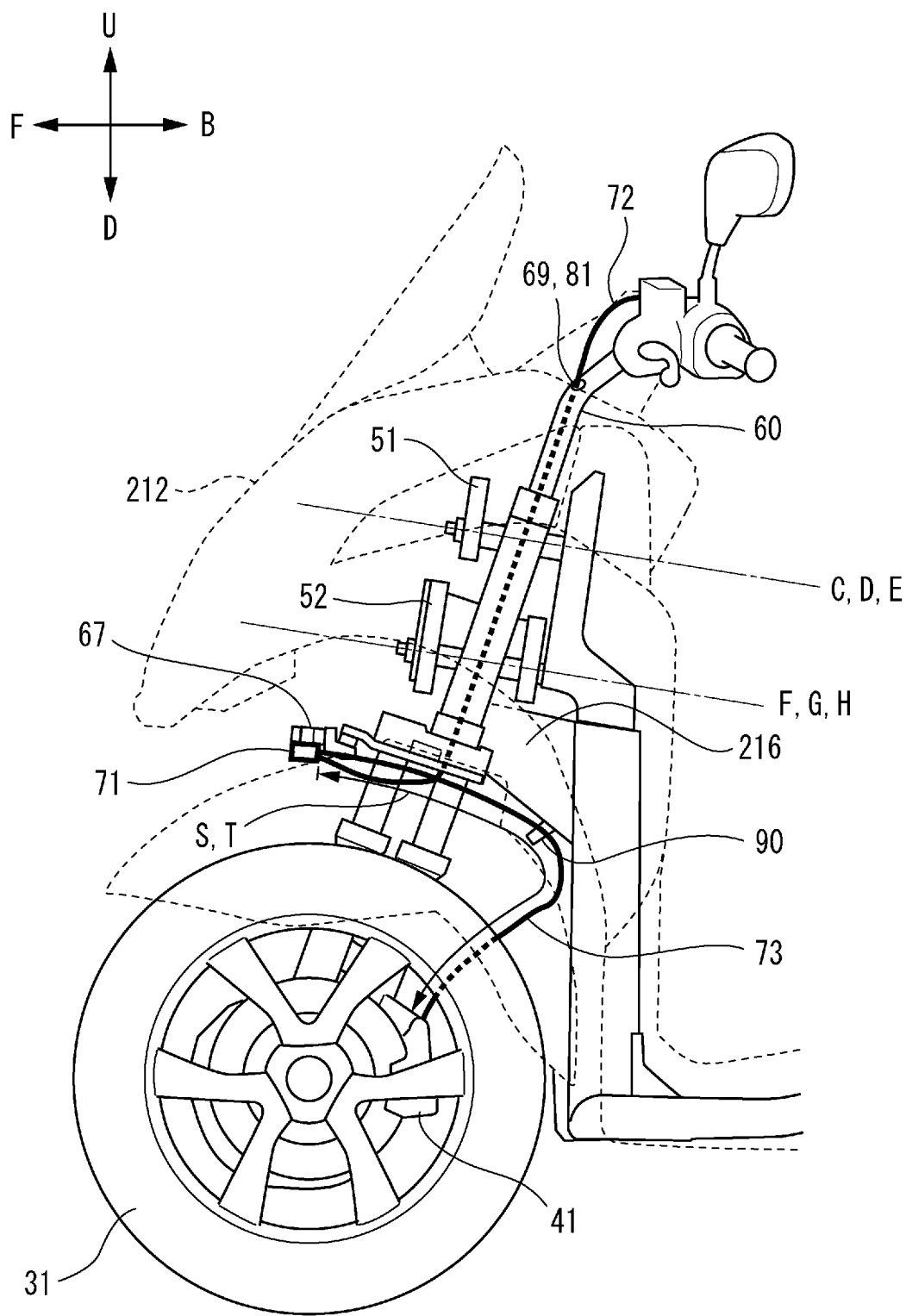
FIG. 21 is a side view of the vehicle shown in FIG. 20.
Figure 22:
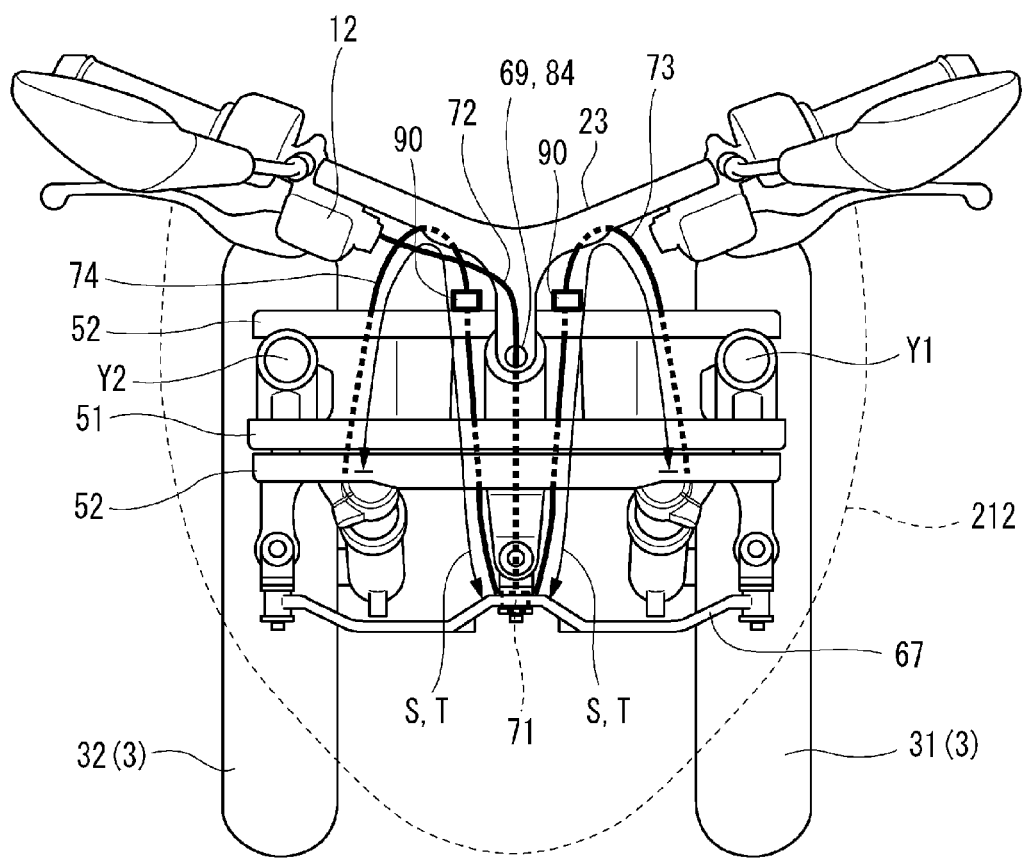
FIG. 22 is a plan view of the vehicle shown in FIG. 20.
Figure 23:
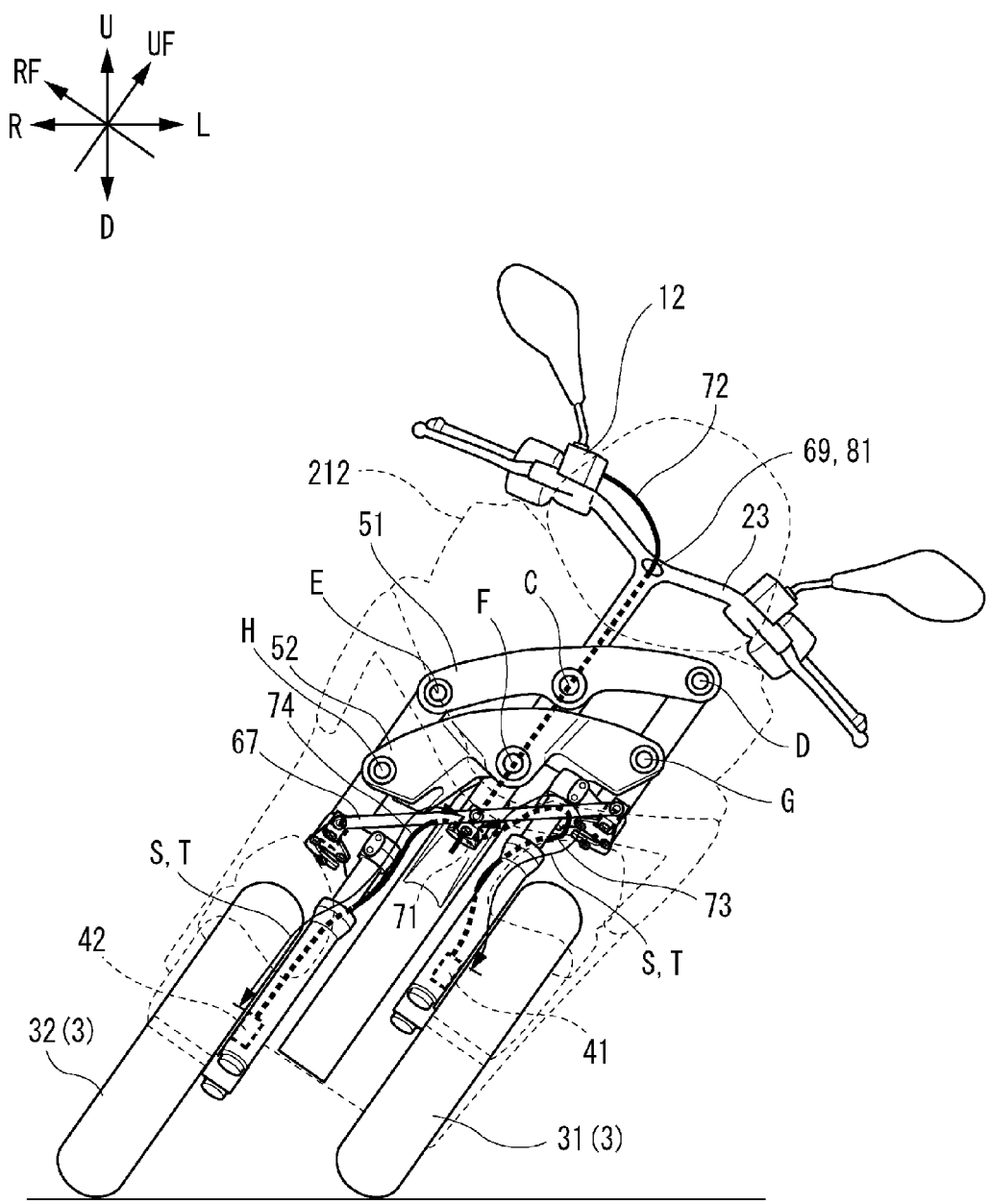
FIG. 23 is a front view of the vehicle shown in FIG. 20 showing a state where the vehicle is caused to lean.
Figure 24:
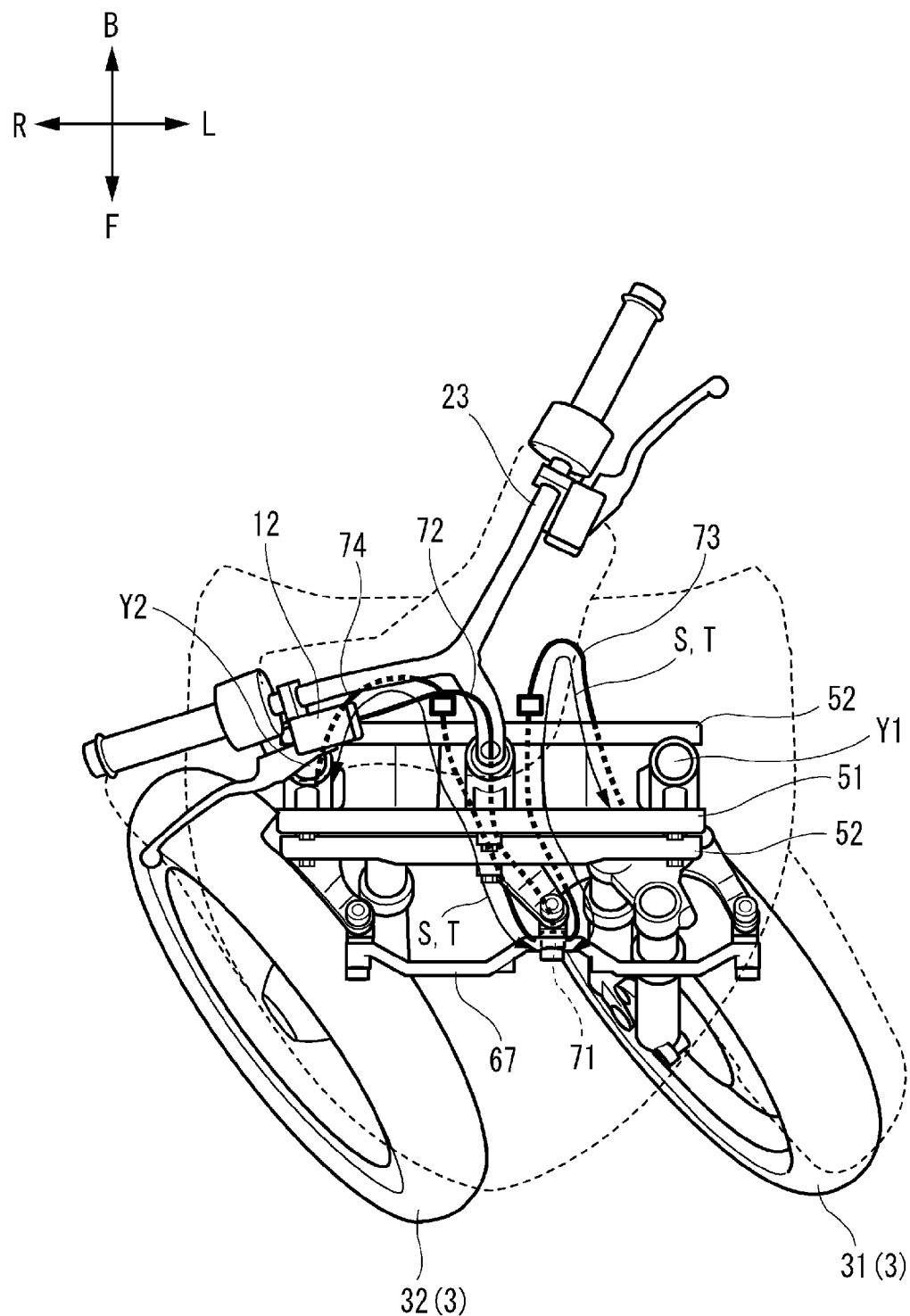
FIG. 24 is a plan view of the vehicle shown in FIG. 20 showing a state where front wheels are turned.

Next, referring to FIGS. 20 to 24, a vehicle 1 according to a third preferred embodiment of the present invention will be described. FIG. 20 is a front view of the vehicle 1 according to this preferred embodiment. FIG. 21 is a side view of the vehicle 1 shown in FIG. 20. FIG. 22 is a plan view of the vehicle 1 shown in FIG. 20. FIG. 23 is a front view of the vehicle 1 shown in FIG. 20 which shows a state in which the vehicle 1 is caused to lean. FIG. 24 is a plan view of the vehicle 1 shown in FIG. 20 which shows a state in which front wheels 3 are turned.

In this preferred embodiment, too, as with the first preferred embodiment, an upstream-side brake hose 72 that extends from a master cylinder 12 is restrained by a second restrictor 81 that is provided at an upper portion of a steering shaft 60 on a turning axis thereof. The upstream-side brake hose 72 is inserted through an interior of the steering shaft 60 from the second restrictor 81 to a lower end of the steering shaft 60.

The upstream-side brake hose 72 that is exposed from the lower end of the steering shaft 60 extends to the front and then extends upward while passing the front of a tie-rod 67 to connect to a branch block 71 that is fixed to a lower surface of the tie-rod 67. This branch block 71 is provided at a central portion of the tie-rod 67 in the front view of the vehicle 1. A left downstream-side brake hose 73 that connects to a left brake caliper 41 and a right downstream-side brake hose 74 that connects to a right brake caliper 42 extend from the branch block 71.

The left downstream-side brake hose 73 is curved so as to expand toward the rear in the side view and the top view of the vehicle 1. The left downstream-side brake hose 73 extends from the branch block 71 to the left. The left downstream-side brake hose 73 that extends from the branch block 71 extends to the rear toward a guide portion 90 that is provided behind the steering shaft 60. The left downstream-side brake hose 73 is bent so as to expand toward the front below the guide portion 90 to connect to the left brake caliper 41.

It is noted that the guide portion 90 is fixed to a gusset 215. The guide portion 90 prevents the left downstream-side brake hose 73 from moving toward the right front wheel 32.

The right downstream-side brake hose 74 is curved so as to expand toward the rear in the side view and the top view of the vehicle 1. The right downstream-side brake hose 74 extends from the branch block 71 to the right. The right downstream-side brake hose 74 that extends from the branch block 71 extends to the rear toward a guide portion 90 that is provided behind the steering shaft 60. The right downstream-side brake hose 74 is bent so as to expand toward the front below the guide portion 90 to connect to the right brake caliper 42.

It is noted that the guide portion 90 is fixed to a gusset 215. The guide portion 90 prevents the right downstream-side brake hose 74 from moving toward the right front wheel 32.

In this preferred embodiment, the brake hose portion (the left downstream-side brake hose 73) extending from the branch block 71 to the left brake caliper 41 and the brake hose portion (the right downstream-side brake hose 74) extending from the branch block 71 to the right brake caliper 42 correspond to both leaning associated deforming portions S and wheel turning associated deforming portions T.

When the vehicle 1 is caused to lean to the left as shown in FIG. 23, the branch block 71 moves toward the left brake caliper 41 and moves away from the right brake caliper 42. Because of this, the left downstream-side brake hose 73 deforms so that an angle defined by the portion that extends to the left from the branch block 71 and the portion that extends downward from the guide portion becomes smaller in the front view of the vehicle 1. When the vehicle 1 is caused to lean in this way, the leaning associated deforming portions S deform. Additionally, the right downstream-side brake hose 74 deforms so that an angle that is defined by the portion that extends to the right from the branch block 71 and the portion that extends downward from the guide portion becomes larger.

When the front wheels 3 are turned in such a way that the travelling direction of the vehicle 1 is oriented to the left as shown in FIG. 24, the branch block 71 moves toward the left brake caliper 41 and moves away from the right brake caliper 42.

Because of this, the left downstream-side brake hose 73, which is the left wheel turning associated deforming portion T, is bent in the left-and-right direction so that the radius of curvature thereof becomes smaller in a top view of the vehicle 1. Specifically, the angle defined by the portion from the branch block 71 to the guide portion 90 and the portion from the guide portion 90 to the left brake caliper 41 becomes smaller.

Additionally, the right downstream-side brake hose 74, which is the right wheel turning associated deforming portion T, is bent in the left-and-right direction so that the radius of curvature thereof becomes larger in the top view of the vehicle 1. Specifically, the angle defined by the portion from the branch block 71 to the guide portion 90 and the portion from the guide portion 90 to the right brake caliper 42 becomes larger.

In this way, in the vehicle 1 according to this preferred embodiment, too, at least portions of the leaning associated deforming portions S are located between the first restrictor 71 that is provided below a lower cross portion 52 in an up-and-down direction of a body frame 21 and at a central portion in the left-and-right direction of the body frame 21 to prevent the movement of the brake controlling operation transmission member and the brake devices 41, 42 (the left and right brake calipers 41, 42).

Because of this, the leaning associated deforming portions S are provided in the space that permits the displacement of the lower cross portion 52, the right member and the left member, so that the vehicle 1 is small in size while securing the space where to accommodate the brake controlling operation transmission member. This provides the vehicle 1 including the two front wheels and the body frame 21 that leans which prevents the enlargement in size of the front portion of the vehicle 1 while ensuring the degree of freedom in designing the suspension devices and the front wheels.

Additionally, according to the vehicle 1 of this preferred embodiment, as shown in FIG. 21, at least portions of the wheel turning associated deforming portions T cross the lower cross portion 52 in the front-and-rear direction of the body frame 21 below the lower cross portion 52 in relation to the up-and-down direction of the body frame 21 in the side view of the vehicle 1.

Since a front-and-rear dimension of the right front wheel 32 and the left front wheel 31 becomes large in such a state that the vehicle 1 is in the upright state, the large space is secured in the front-and-rear direction below the lower cross portion 52 so as to prevent the interference of the lower cross portion 52 with the right front wheel 32 and the left front wheel 31. The wheel turning associated deforming portions T are provided so that the wheel turning associated deforming portions T cross the lower cross portion 52 in the front-and-rear direction by using the space below the lower cross portion 52 largely. This prevents the enlargement in size of the vehicle 1 while absorbing the deformation of the brake controlling operation transmission member resulting from the turning of the right front wheel 32 and the left front wheel 31 without difficulty by causing the wheel turning associated deforming portions T to deform largely.

The preferred embodiments that have been described heretofore are intended to facilitate the understanding of the present invention and is not intended to limit the present invention. It is apparent that the present invention can be modified or improved without departing from the spirit and scope thereof and that their equivalents can also be included in the present invention.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made below are permitted.

In addition, in the preferred embodiments described above, while the brake hose that transmits the brake fluid from the master cylinder 12 to the brake calipers is preferably an example of the brake controlling operation transmission member, the present invention is not limited thereto. For example, the brake controlling operation transmission member may be an electric wire that transmits a control signal that signals an activation of the brake device that applies a braking force to the front wheels 3 from the brake controller 10 to the brake device. Alternatively, the brake controlling operation transmission member may be a metallic tube of which a brake fluid is filled in an interior, or a metallic cable that connects the master cylinder 12 to the brake calipers. In addition, as the brake controlling operation transmission member, the brake hose may be combined with one or more of the electric wire, the metallic tube, the metallic cable and the like to connect the master cylinder 12 to the brake calipers.

Additionally, in the preferred embodiments that have been described above, while a portion of the brake controlling operation transmission member is preferably inserted into the interior of the steering shaft 60 to be disposed along the steering shaft 60, the present invention is not limited thereto. The portion of the brake controlling operation transmission member may be located at the front, rear, right, or left of the steering shaft 60 so as to be disposed along the steering shaft 60. Alternatively, the portion of the brake controlling operation transmission member may be wound around an outer circumferential surface of the steering shaft 60 so as to be disposed along the steering shaft 60.

Additionally, in the preferred embodiments that have been described above, while a portion of the brake controlling operation transmission member is preferably located between the front end and the rear end of the lower cross portion 52 in the side view of the vehicle. In the side view of the vehicle, a portion of the brake controlling operation transmission member may be located ahead of the front end of the upper cross portion 51 or behind the rear end of the upper cross portion 51. Alternatively, in the side view of the vehicle, a portion of the brake controlling operation transmission member may be located ahead of the front end of the lower cross portion 52 or behind the rear end of the lower cross portion 52.

In addition, in the preferred embodiments that have been described above, while a portion of the brake controlling operation transmission member is preferably located between the left side portion 53 and the right side portion 54 in the front view of the vehicle, the present invention is not limited thereto. In the front view of the vehicle, a portion of the brake controlling operation transmission member may be located on the left of the left side portion 53 or on the right of the right side portion 54.

In the preferred embodiments that have been described above, while the second restrictors 81 and the third restrictors 82 are described as preferred examples of the restrictor, the present invention is not limited thereto. For example, a metallic fastener or a ribbon that is fixed to the body frame 21 or the like to prevent the movement of the brake hose or a sleeve or rubber bush of which the brake hose is inserted through an interior may be used as the restrictor. It is noted that the restrictor 80 is not limited to those described above and hence should be any member as long as it prevents the movement of the brake hose.

Additionally, in the preferred embodiments described above, while the left brake caliper 41 and the right brake caliper 42 are preferably controlled by the master cylinder 12 that is provided at the right portion of the handlebar 23, the present invention is not limited thereto. A configuration may be used in which either of the left brake caliper 41 and the right brake caliper 42 is controlled by, for example, the master cylinder 12 that is provided at the right portion of the handlebar 23 and that is positioned above the link mechanism, while the other of the left brake caliper 41 and the right brake caliper 42 is controlled by a foot brake that is not positioned above the link mechanism.

In the preferred embodiments described above, the acute angles are angles that include 0° and that are smaller than 90°. Normally, the acute angles do not include 0°, but in the preferred embodiments of the present invention, it is understood that the acute angles include 0°. In the preferred embodiments described above, the imaginary plane that intersects perpendicular or substantially perpendicularly the upper axes and the lower axes of the cross members is a plane that extends rearward and upward. However, the present invention is not limited thereto, and hence, the imaginary plane that intersects perpendicular or substantially perpendicularly the upper axes and the lower axes of the cross members may be a plane that extends forward and upward.

When referred to in this description, "parallel" also includes two straight lines that do not intersect each other as members while they are inclined within the range of ±40°. When used together with a "direction" and a "member" in the present invention, "along" also includes a case where what follows the direction and the member is inclined relative thereto within the range of ±40°. When used together with a "direction" in the present invention, "extend" also includes a case where what extends is inclined relative to the direction within the range of ±40°.

The vehicle 1 according to various preferred embodiments of the present invention is the vehicle 1 including the body frame which leans and the two front wheels. The number of rear wheels may be one or more. The vehicle may include a body cover that covers the body frame. The vehicle may not include the body cover which covers the body frame. The power unit includes the power source. The power source is not limited to the engine and hence may be an electric motor.

In the preferred embodiments described above, the center in the left-and-right direction of the body frame 21 of the rear wheel 4 preferably coincides with the center in the left-and-right direction of the body frame 21 of the distance defined between the left front wheel 31 and the right front wheel 32. Although the configuration described above is preferable, the center in the left-and-right direction of the body frame 21 of the rear wheel 4 does not have to coincide with the center in the left-and-right direction of the body frame 21 of the distance defined between the left front wheel 31 and the right front wheel 32.

In the preferred embodiments described above, the right side portion 54, the left side portion 53, and the headstock 211 (the link support portion) are preferably provided in positions that overlap in the side view of the vehicle 1. However, in the side view of the vehicle 1, the headstock 211 may be provided in a different position from the positions where the right side portion 54 and the left side portion 53 are provided in relation to the front-and-rear direction. Additionally, angles at which the right side portion 54 and the left side portion 53 lean from the up-and-down direction of the body frame 21 may differ from an angle at which the headstock 211 leans.

The link support portion (the headstock) may include a single portion or a plurality of portions. In the case of the headstock includes a plurality of portions, the portions may be joined together through welding, bonding or the like. Alternatively, the portions may be joined together with fastening members such as bolts, rivets or the like.

In the preferred embodiments described above, the body frame includes the link support portion, the connecting member (the upper front-and-rear frame portion), the down frame (the up-and-down frame portion) and the under frame (the lower front-and-rear frame portion), and these frame elements are connected together through welding. However, the body frame of the present invention is not limited to the preferred embodiments. The body frame preferably includes the link support portion, the upper front and rear frame portions, the upper and lower frame portions and the lower front and rear frame portions. For example, the body frame may be formed integrally wholly or partially through casting. Additionally, in the body frame, the upper front and rear frame portions and the upper and lower frame portions may include a single member or may include separate members.

In the preferred embodiments described above, the left shock absorber 33 and the right shock absorber 34 each preferably include the pair of telescopic mechanisms. However, depending upon the specification of the vehicle 1, the number of telescopic mechanisms that the left shock absorber 33 and the right shock absorber 34 include individually may be one.

In the preferred embodiments described above, an acute angle defined by the turning axis of the steering shaft and the up-and-down direction of the body frame preferably coincides with an acute angle defined by the direction in which the right shock absorber and the left shock absorber extend or contract and the up-and-down direction of the body frame. However, the present invention is not limited to the preferred embodiments described above. For example, the acute angle defined by the turning axis of the steering shaft and the up-and-down direction of the body frame may be smaller or greater than the acute angle defined by the direction in which the right shock absorber and the left shock absorber extend and contract and the up-and-down direction of the body frame.

In addition, in the preferred embodiments described above, the turning axis of the steering shaft and the direction in which the right shock absorber and the left shock absorber extend and contact coincide with each other. However, the present invention is not limited to the preferred embodiments described above. In a side view of the vehicle being in the upright state, the turning axis of the steering shaft and the direction in which the right shock absorber and the left shock absorber extend or contact may be spaced away from each other in the front-and-rear direction. Additionally, for example, the turning axis of the steering shaft and the direction in which the right shock absorber and the left shock absorber extend or contact may intersect each other.

In this preferred embodiment, the right front wheel and the left front wheel preferably are supported so that their upper ends can move farther upward in the up-and-down direction of the body frame than an upper end of the down frame of the body frame. However, the present invention is not limited to this preferred embodiment. In the present invention, the right front wheel and the left front wheel may be able to move upward as high as or to a height that is lower than the upper end of the down frame of the body frame in the up-and-down direction of the body frame.

The upper cross portion may include an upper front cross portion that includes a single portion, an upper rear cross portion that includes a single portion, and a connecting member that is provided between the upper and lower cross portions and that includes a plurality of portions. In the case of the headstock includes a plurality of portions, the portions may be joined together through welding, bonding or the like. Alternatively, the portions may be joined together with fastening members such as bolts, rivets or the like.

The lower cross portion may include a lower front cross portion that includes a single portion, a lower rear cross portion that includes a single portion and a connecting member that is provided between the lower front and rear cross portions and that includes a plurality of portions. In the case of the headstock includes a plurality of portions, the portions may be joined together through welding, bonding or the like. Alternatively, the portions may be joined together with fastening members such as bolts, rivets or the like.

The right side portion and the left side portion may each include a single portion or a plurality of portions. In the case of the headstock including a plurality of portions, the portions may be joined together through welding, bonding or the like. Alternatively, the portions may be joined together with fastening members such as bolts, rivets or the like. The right side portion and the left side portion may each include a portion that is disposed ahead of the upper cross portion or the lower cross portion in the front-and-rear direction of the body frame and a portion that is disposed behind the upper cross portion or the lower cross portion in the front-and-rear direction of the body frame. The upper cross portion or the lower cross portion may be disposed between the portions that are disposed ahead of the right side portion and the left side portion and the portions that are disposed behind the right side portion and the left side portion.

In the preferred embodiments of the present invention, the link mechanism may include further a cross portion in addition to the upper cross portion and the lower cross portion. The upper cross portion and the lower cross portion are so called only from their relative positional relationship in the up-and-down direction. The upper cross portion does not imply an uppermost cross portion in the link mechanism. The upper cross portion means a cross portion that is located above a cross portion that is located therebelow. The lower cross portion does not imply a lowermost cross portion in the link mechanism. The lower cross portion means a cross portion that is located below a cross portion that is located thereabove. Additionally, the cross portion may include two portions of a right cross portion and a left cross portion. In this way, the upper cross portion and the lower cross portion may each include a plurality of cross portions as long as they still exhibit the link function. Further, other cross portions may be provided between the upper cross portion and the lower cross portion. The link mechanism should include the upper cross portion and the lower cross portion.

The present invention can be embodied in many different forms. This disclosure should be understood to provide principle preferred embodiments of the present invention. Based on the understanding that the preferred embodiments that are described and/or illustrated herein are not intended to limit the present invention thereto, several preferred embodiments are described and illustrated herein.

Several illustrated preferred embodiments of the present invention are described herein. The present invention is not limited to the various preferred embodiments described herein. The present invention also includes every preferred embodiment that includes equivalent elements, modifications, deletions, combinations (for example, a combination of characteristics of various preferred embodiments), improvements and/or alternations that those skilled in the art to which the present invention pertains can recognize based on the disclosure herein. The limitative matters of claims should be construed broadly based on terms used in the claims and hence should not be limited by the preferred embodiments described in this description or the prosecution of this patent application. The preferred embodiments should be construed to be non-exclusive. For example, in this disclosure, such terms as "preferable" and "good" are non-exclusive terms and mean that "it is preferable but does not limit the present invention thereto" and "it is good but does not limit the present invention thereto," respectively.

The contents of the Japanese Patent Application No. 2013-138483 filed on Jul. 1, 2013 are incorporated hereby by reference in their entirety and constitute a portion of the description of this patent application. In particular, configurations which will be itemized below also constitute a portion of the description of this patent application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
a body frame that leans to a right of the vehicle when the vehicle turns right and that leans to a left of the vehicle when the vehicle turns left;
a right front wheel and a left front wheel that are aligned in a left-and-right direction of the body frame;
a right suspension device that supports the right front wheel at a lower portion thereof and that absorbs an upward displacement of the right front wheel in an up-and-down direction of the body frame;
a left suspension device that supports the left front wheel at a lower portion thereof and that absorbs an upward displacement of the left front wheel in the up-and-down direction of the body frame;
a link mechanism which includes:
a right side portion that supports an upper portion of the right suspension device so as to allow the upper portion to turn about a right steering axis that extends in the up-and-down direction of the body frame;
a left side portion that supports an upper portion of the left suspension device so as to allow the upper portion to turn about a left steering axis that is parallel or substantially parallel to the right steering axis;
an upper cross portion that supports an upper portion of the right side portion at a right end portion thereof so as to allow the upper portion to turn about an upper right axis that extends in a front-and-rear direction of the body frame, supports an upper portion of the left side portion at a left end portion thereof so as to allow the upper portion to turn about an upper left axis that is parallel or substantially parallel to the upper right axis, and that is supported on the body frame at a middle portion thereof so as to turn about an upper middle axis that is parallel or substantially parallel to the upper right axis and the upper left axis; and
a lower cross portion that supports a lower portion of the right side portion at a right end portion so as to allow the lower portion to turn about a lower right axis that is parallel or substantially parallel to the upper right axis, supports a lower portion of the left side portion at a left end portion thereof so as to allow the lower portion to turn about a lower left axis that is parallel or substantially parallel to the upper left axis, and that is supported on the body frame at a middle portion thereof so as to turn about a lower middle axis that is parallel or substantially parallel to the upper middle axis;
a cover that covers at least of a portion of the link mechanism;
a brake device that is provided below the link mechanism to apply a braking force to, at least, one of the right front wheel and the left front wheel;
a brake controller that is provided above the link mechanism in relation to the up-and-down direction of the body frame to control the brake device; and
a brake controlling operation transmission member that connects the brake controller with the brake device to transmit a brake controlling operation that is inputted into the brake controller to the brake device; wherein
the brake controlling operation transmission member includes a leaning associated deforming portion that deforms in response to the leaning of the body frame; and
at least a portion of the leaning associated deforming portion is located between a first restrictor that is provided below the lower cross portion in relation to the up-and-down direction of the body frame and at a central portion in the left-and-right direction of the body frame to prevent movement of the brake controlling operation transmission member.

2. The vehicle according to claim 1, further comprising:
a steering shaft that is supported on the body frame between the right suspension device and the left suspension device in the left-and-right direction of the body frame so as to turn about a middle steering axis that extends in the up-and-down direction of the body frame;
a handlebar that is provided at an upper end portion of the steering shaft; and
a wheel turning operation transmission mechanism that turns the right suspension device about the right steering axis and turns the left suspension device about the left turning axis in association with the turning of the steering shaft that is activated in response to the operation of the handlebar; wherein
the brake controlling operation transmission member includes a wheel turning associated deforming portion that deforms in response to the turning of the right suspension device and the left suspension device, and wherein
at least a portion of the wheel turning associated deforming portion is disposed below the lower cross portion in relation to the up-and-down direction of the body frame and between the first restrictor and the brake device.

3. The vehicle according to claim 2, wherein at least a portion of the wheel turning associated deforming portion is provided below the lower cross portion in relation to the up-and-down direction of the body frame so as to cross the lower cross portion in the front-and-rear direction of the body frame in a side view of the vehicle.

4. The vehicle according to claim 2, wherein the first restrictor is provided at a portion of the wheel turning operation transmission mechanism that moves so as to maintain a parallel or substantially parallel relationship with the lower cross portion when the body frame leans.

5. The vehicle according to claim 1, further comprising:
a steering shaft that is supported on the body frame between the right suspension device and the left suspension device in the left-and-right direction of the body frame so as to turn about a middle steering axis that extends in the up-and-down direction of the body frame, wherein the brake controlling operation transmission member is inserted through an interior of the steering shaft.

6. The vehicle according to claim 1, further comprising:
a steering shaft that is supported on the body frame between the right suspension device and the left suspension device in the left-and-right direction of the body frame so as to turn about a middle steering axis that extends in the up-and-down direction of the body frame; and
a handlebar that is provided at an upper end portion of the steering shaft; wherein
a second restrictor that prevents the movement of the brake controlling operation transmission member is provided on the steering shaft or a member that turns together with the steering shaft above the upper cross portion in the up-and-down direction of the body frame.

7. The vehicle according to claim 6, wherein a portion of the brake controlling operation transmission member that is located between the second restrictor and the first restrictor is provided along the steering shaft.

* * * * *